(12) United States Patent
Dollase et al.

(10) Patent No.: US 8,372,932 B2
(45) Date of Patent: Feb. 12, 2013

(54) PRESSURE-SENSTIVE ADHESIVES AND PROCESS FOR PREPARING THEM

(75) Inventors: Thilo Dollase, Hamburg (DE);
Aranzazu Escudero Vallejo, Hamburg (DE); Bernd Lühmann, Norderstedt (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/898,163

(22) Filed: Oct. 5, 2010

(65) Prior Publication Data

US 2011/0039970 A1  Feb. 17, 2011

Related U.S. Application Data

(63) Continuation of application No. 11/233,456, filed on Sep. 22, 2005.

(30) Foreign Application Priority Data

May 12, 2005  (DE) .......................... 10 2005 022 782

(51) Int. Cl.
*C08J 3/28* (2006.01)
*C09J 109/00* (2006.01)
*C09J 123/08* (2006.01)
*C09J 123/14* (2006.01)
*C09J 183/04* (2006.01)

(52) U.S. Cl. .................. 526/931; 525/332.5; 525/333.7; 525/474; 525/329.5; 525/330.3; 525/330.9

(58) Field of Classification Search .................. 526/931; 525/332.5, 333.7, 329.5, 330.3, 330.9, 474
See application file for complete search history.

(56) References Cited

U.S. PATENT DOCUMENTS 4,141,841 A 2/1979 McDonald
4,163,081 A 7/1979 Schulz
(Continued)

FOREIGN PATENT DOCUMENTS

DE 101 48 731 4/2003
DE 102 08 843 9/2003
(Continued)

OTHER PUBLICATIONS

G. Heinrich, M. Klüppel, Adv. Polym. Sci., 2002, 160, 1-44.
M. Pahl, W. Gleigle, H.-M. Laun, Praktische Rheologie der Kunststoffe und Elastomere, 4th ed., 1995, VDI Verlag, Dusseldorf, p. 191f.

(Continued)

*Primary Examiner* — Thao T. Tran
(74) *Attorney, Agent, or Firm* — Norris McLaughlin & Marcus PA

(57) ABSTRACT

The invention relates to a process for preparing a pressure-sensitive adhesive based on at least one polymer, in the course of which said at least one polymer is crosslinked, the polymer having functional groups Y and having been admixed, further, with at least one kind of functionalized particles which have at least one nonpolymeric base unit, wherein the particles having a surface modification of the base unit, the surface modification of the particles having at least one kind of functional groups X, and the crosslinking of the polymer being brought about at least in part by a reaction of the functional groups X of the particles and the functional groups Y of the polymer, and further to pressure-sensitive adhesives based on at least one crosslinked polymer component, the crosslinking of the polymer component being brought about at least in part by incorporation of the functionalized particles, the particles having at least one nonpolymeric base unit and also a surface modification of this base unit, and the surface modification of the particles having at least one kind of functional groups X which are capable of reacting with functional groups Y present in the polymer component, and also to the use of surface-modified functionalized particles having a nonpolymeric base unit as crosslinking reagents for crosslinking polymers for preparing pressure-sensitive adhesives.

2 Claims, 4 Drawing Sheets

U.S. PATENT DOCUMENTS

| | | | |
|---|---|---|---|
| 4,524,104 | A | 6/1985 | Hagio et al. |
| 4,710,536 | A | 12/1987 | Klingen et al. |
| 5,128,386 | A | 7/1992 | Rehmer et al. |
| 5,532,112 | A | 7/1996 | Kohler et al. |
| 5,663,224 | A | 9/1997 | Emmons et al. |
| 5,718,841 | A | 2/1998 | Mardis et al. |
| 5,739,087 | A | 4/1998 | Dennis |
| 5,916,863 | A | 6/1999 | Iacobucci et al. |
| 6,228,133 | B1 * | 5/2001 | Thurber et al. ............... 51/295 |
| 6,617,020 | B2 | 9/2003 | Zhou et al. |
| 6,646,086 | B2 | 11/2003 | Stone |
| 6,883,908 | B2 * | 4/2005 | Young et al. ............... 347/102 |
| 6,989,192 | B2 | 1/2006 | Husemann et al. |
| 2002/0128336 | A1 | 9/2002 | Kolb et al. |
| 2004/0235997 | A1 | 11/2004 | Meisenburg et al. |

FOREIGN PATENT DOCUMENTS

| | | |
|---|---|---|
| EP | 0 281 941 | 9/1988 |
| EP | 377 199 | 7/1990 |
| EP | 900 260 | 3/1999 |
| JP | 2002-167557 | 6/2002 |
| WO | 00/43539 | 7/2000 |
| WO | 02/24756 | 3/2002 |
| WO | 02/062881 | 8/2002 |
| WO | 02/081586 | 10/2002 |
| WO | 03/016411 | 2/2003 |
| WO | 2005/007733 | 1/2005 |

OTHER PUBLICATIONS

R. I. Tanner, Engineering Rheology, 2nd ed., 2000, Oxford University Press, Oxford, p. 523f.

V. D. McGinniss in Encyclopedia of Polymer Science and Engineering, H. F. Mark, N.M. Bikales, C. G. Overberger, G. Menges (eds.), 2nd ed., 1986, Wiley, New York, vol. 4, p. 418ff.

W. Gleißle, Rheol. Acta, 1982, 21, 484-487.

R. N. Rothon (ed.), "Particulate-Filled Polymer Composites" 2nd ed., 2003, Rapra Technology, Shawbury, 153-206.

A. Kolar, H. F. Gruber, G. Greber, JMS Pure Appl. Chem., 1994, A31, 305-318.

F. Bauer, H. Ernst, U. Decker, M. Findeisen, H.-J. Glasel, H. Langguth, E. Hartmann, R. Mehnert, C. Peuker, Macromol. Chem. Phys., 2000, 201, 2654-2659.

H. Großmann in Katalysatoren, Tenside und Mineralöladditive, H. Falbe, U. Hasserodt (ed.), 1978. G. Thieme, Stuttgart, p. 135ff.

D. Philp, J. F. Stoddard, Angew. Chem., 1996, 108, 1242-1286.

C. Schmuck, W. Wienand, Angew. Chem., 2001, 113, 4493-4499.

M. Rehahn, Acta Polym., 1998, 49, 201-224.

B. G. G. Lohmeijer, U. S. Schubert, J. Polym. Sci. A Polym. Chem., 2003, 41, 1413-1427.

M. Pahl, W. Gleißle, H.-M. Laun, Praktische Rheologie der Kunststoffe und Elastomere, 4th ed., 1995, VDI Verlag, Dusseldorf, p. 320ff.

G. Lagaly in Tonminerale und Tone, K. Jasmund, G. Lagaly (ed.), 1993, Steinkopff, Darmstadt, p. 366ff.

\* cited by examiner

PRESSURE-SENSTIVE ADHESIVES AND PROCESS FOR PREPARING THEM

This application is a Continuation of U.S. application Ser. No. 11/233,456 filed Sep. 22, 2005, pending, which claims foreign priority benefit under 35 U.S.C. §119 of German Patent Application No. 10 2005 022 782.1 filed May 12, 2005.

The present invention relates to pressure-sensitive adhesives which preferentially can be processed without solvent and are distinguished not only by good processing properties and, in particular, coatability but also by good product properties. The invention embraces the composition of innovative pressure-sensitive adhesive formulations and also their preparation, processing, and use in self-adhesive products. Also part of this invention is an innovative scheme allowing the combination of good processing properties and good product properties to be realized for pressure-sensitive adhesive formulations of this kind.

BACKGROUND OF THE INVENTION

Within the field of adhesives, pressure-sensitive adhesives (PSAs) are notable in particular for their permanent tack. A material which has permanent tack must at any given point in time have an appropriate combination of adhesive and cohesive properties. This distinguishes it, for example, from reactive adhesives, which in the unreacted state offer virtually no cohesion. For good product properties it is appropriate to adjust PSAs in such a way that the balance of adhesive and cohesive properties is at an optimum. This balance is typically achieved by converting polymer chains present in PSA formulations into wide-meshed networks. The nature of this network has a critical influence on the adhesive and cohesive properties of the PSA. A material featuring pronounced crosslinking, although having good cohesion, nevertheless has reduced pliancy, so that the material is unable to adapt adequately to the roughness of a substrate surface. Moreover, a material featuring pronounced crosslinking has only a relatively low ability to dissipate deformation energy such as occurs under load. Both phenomena reduce the bond strength. A material with a low level of crosslinking, in contrast, although able to flow on rough surfaces and to dissipate deformation energy, with the consequence that the adhesion requirements may be met, is nevertheless inadequate in its resistance to load, owing to a reduced cohesion.

One kind of crosslinking which has an effect on the adhesion/cohesion balance is temporary polymer-chain interlooping. However, this is sufficient for adequate cohesion of the PSA only when the molar mass of the polymers is sufficiently high. PSAs based on natural rubbers may rest solely on this crosslinking principle. Further possibilities of setting the crosslinking of the PSA are chemical crosslinks, which are therefore irreversible. Chemical crosslinking can also be achieved by means of radiation treatment of the PSAs. Another possibility is to utilize physical crosslinking principles. Examples of such crosslinks, typically thermoreversible, in PSAs are present in thermoplastic elastomers, such as in certain block copolymers or semicrystalline polymers.

Besides the crosslinking principles referred to, it is also possible to use fillers for raising the cohesion. In that case a combination of filler/filler interactions and filler/polymer interactions frequently leads to the desired reinforcement of the polymer matrix. A raising of cohesion based thereon represents a further physical crosslinking variety.

For fillers which are mentioned with a view to a reinforcing effect in PSAs, the class of the pyrogenic (or fumed) silicas deserves particular mention. These silicas are used, inter alia, as thickeners, gelling agents or thixotropic agents in a very wide variety of fluids, utilizing their effect on the rheological properties of the fluids. The use of hydrophilic and of hydrophobic silica is described in this context. Examples of the use of pyrogenic silica in the field of PSAs are described in U.S. Pat. No. 4,163,081 by Dow Corning, in U.S. Pat. No. 4,710,536 by 3M and in DE 102 08 843 A1 by BASF AG.

As further fillers, the use of modified phyllosilicates for improving product properties has been described in WO 02/81586 A1 by 3M, in WO 02/24756 A2 by Rohm & Haas and in JP 2002 167,557 by Sekisui.

In all of these cases the reinforcement results from the effect of the particles on the elasticity modulus of the elastomer composite. The interaction in this case is brought about by physical interactions between individual particles, on the one hand, and between particles and polymers, on the other. Often, however, these physical interactions are not enough to withstand even low mechanical deformations, such as may occur, for example, when a PSA joint is loaded by shearing or peeling. This nonlinear phenomenon is known as the Payne effect and is manifested as a loss of elasticity modulus under deformation. A review of the description of this effect and of various approaches as a mechanistic explanation is given by Heinrich and Klüppel [G. Heinrich, M. Klüppel, *Adv. Polym. Sci.*, 2002, 160, 1-44].

In the preceding section, a variety of examples have been given of types of crosslinking that may be employed in PSAs for improving the product properties, especially the cohesion. For each of these varieties of crosslinking, the question arises of to what extent they affect the processing properties, and more particularly the coating characteristics. This is debated below.

Besides the product properties and hence the optimum balance of adhesive and cohesive properties in a PSA, its processing properties are also of central importance. Generally speaking, the processing properties of a formulation are reduced by its crosslinking. In a majority of cases indeed, processing becomes impossible. It is therefore advantageous to carry out or to initiate crosslinking not until during or after processing, and in particular during or after coating. However, where the crosslinking state results from the mere presence of a constituent in the formulation, as is the case with the abovementioned fillers, then the processing characteristics are adversely affected by its very presence. Polymers with high molar masses are likewise among formulation constituents which by virtue of their state of interlooping have advantageous product properties and yet, likewise owing to their state of interlooping, may show disadvantages in processing properties. In both cases, namely both interlooping and fillers, the physical principles which lead to the crosslinking of the PSA system and hence to advantageous product properties have negative consequences for the processing characteristics, particularly the coatability.

Traditional approaches to escaping this dilemma have been based on the use of solvents as operating assistants. An increased environmental awareness and the desire for ever-more efficient production techniques, however, are underlying the trend toward solvent-free operations. In comparison to solvent processing methods, the polymer-based PSA base compositions, in the case of the hotmelt processes have a state of crosslinking in their melt, as a result of the interlooping and/or filler particles, which is associated with significantly higher viscosities and elasticities.

In contrast to physical modes of crosslinking, chemical crosslinking methods afford the formation of a network which can be initiated by an appropriate operating regime only during processing. However, the use of chemical crosslinkers is limited by their pot-life reactivity. If the network forms in too pronounced a way before the material has been coated, the elasticity increase which has already taken place results in a deterioration in the processing properties, and reduced-quality coating outcomes may result. One particular difficulty arises in the case of solvent-free systems, since, here, elevated temperatures are necessary for processing, leading at the same time to an acceleration of the chemical crosslinking reaction.

One example of a system of this kind is described in U.S. Pat. No. 4,524,104 by Sanyo. Radiation crosslinking methods appear advantageous in this context, since only after coating is the formation of a network initiated deliberately, as proposed for example in EP 377 199 by BASF. However, in order to obtain networks having a structure satisfying the subsequent product requirements in respect of shear strength, polymers of decidedly high molar mass are needed, which in turn, as a result of their state of interlooping, may have disadvantages in terms of processing characteristics.

Typically, the processing properties of a material deteriorate as its elasticity goes up. Formation of a network always leads to an increase in the storage modulus and hence to upper elasticity. Consequently, there is a deterioration in the fluidity, which is needed for processing of the coating, or even a complete loss of fluidity. In the case of coating, then, inhomogeneities may occur in the coating outcome, possibly going as far as melt fracture. A variety of authors describe this phenomena, especially for capillary dies and extrusion dies. Literature references on this can be found in Pahl et al. [M. Pahl, W. Gleißle, H.-M. Laun, Praktische Rheologie der Kunststoffe and Elastomere, 4th ed., 1995, VDI Verlag, Düsseldorf, p. 191f] and Tanner [R. I. Tanner, Engineering Rheology, 2nd ed., 2000, Oxford University Press, Oxford, p. 523f].

Systems are therefore sought which preferably can be coated without solvent and which exhibit a combination of good product properties on the one hand—and here particularly in respect of cohesion—and improved processing properties on the other, especially coatability.

One particularly advantageous example of systems which at least partly satisfy this combination of requirements is represented by block copolymers comprising segments which soften at high temperatures (known as the hard phase) and others which at application temperature are present in melted form. The softening temperature of the hard phase is typically adjusted, through the use of specific monomers, such that good product properties prevail at room temperature and yet at temperatures that are rational from an operational standpoint the material can easily be coated from the melt. Since these materials typically do not have high molar masses, their melt viscosity and elasticity, as soon as the hard phase is in softened form, are comparatively low.

A disadvantage of the above-discussed PSAs based on block copolymers, however, is their thermal shear strength, which is limited by the softening of the hard domains that sets in at an elevated temperature. A further disadvantage to be cited are the costly and inconvenient preparation conditions for block copolymers. In order to be able to prepare polymers having the requisite block like structure in sufficient quality, controlled or living polymerization techniques are necessary, some of which are complex. Moreover, not all monomer combinations can always be easily realized. Hence the block copolymer approach, on the one hand, therefore, is seen as not being universally flexible for numerous polymer systems. On the other hand there is a need for PSAs having better thermal shear strength.

It is therefore an objective of the present invention to provide a flexible scheme which encompasses a suitable combination of material and process so that it is possible to prepare PSAs which can preferably be processed without solvent and which have good processing properties and good product properties.

SUMMARY OF THE INVENTION

As has now been found, this combination of requirements, consisting of good processing properties and good product properties, can be obtained by preparing crosslinked PSAs using a process in which a specific PSA formulation comprises particles functionalized in such a way that, during or after the coating operation, the particles can be linked to at least one kind of polymeric constituents of the PSA formulation by exposure to radiation energy, in particular to electromagnetic radiation, to particulate radiation and/or to thermal energy.

DETAILED DESCRIPTION

Figure 1:
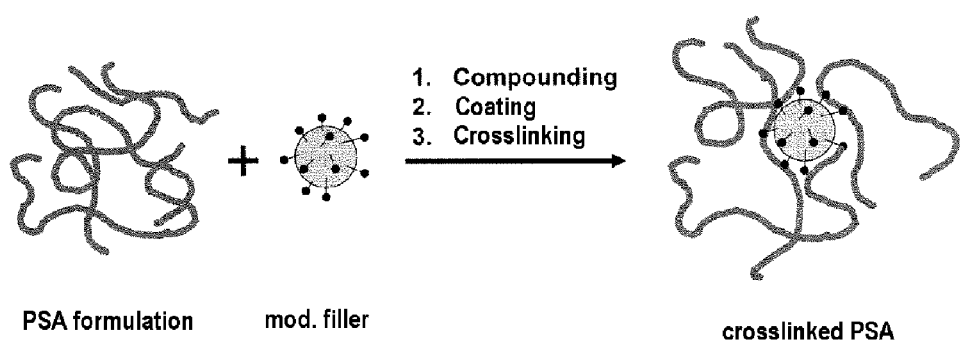
FIG. 1 depicts the overall process of the invention.

The present invention relates to a process for preparing a crosslinked pressure-sensitive adhesive, to crosslinked pressure-sensitive adhesives obtainable by such a process, and to the use of such adhesives. The invention further embraces intermediates from such a process, particularly the composition of innovative formulations for pressure-sensitive adhesives. The combination of the innovative PSA formulations of the invention with the preparation process of the invention is likewise inventive and a central component of this specification (in this regard cf. also FIG. 1).

The invention relates to a process for preparing a pressure-sensitive adhesive based on at least one polymer A, in the course of which said at least one polymer A is crosslinked, the polymer having functional groups Y and having been admixed, further, with at least one kind of functionalized particles B (also called "filler particles" below). The particles have at least one nonpolymeric base unit and also a surface modification of this base unit, the surface modification of the base unit having at least one kind of functional groups X. In accordance with the invention the crosslinking of the polymer is brought about at least in part by a reaction of the functional groups X of the particles and the functional groups Y of the polymer. Within the sense of the invention the crosslinking may also be brought about completely by means of the functionalized particles.

The dependent claims relate to advantageous versions of the process of the invention.

The invention further provides a pressure-sensitive adhesive based on at least one crosslinked polymer component A, the crosslinking of the polymer component A being brought about at least in part by incorporation of functionalized particles B, the particles B having at least one nonpolymeric base unit and also a surface modification of this base unit, and the surface modification of the particles B having at least one kind of functional groups X which are capable of reacting with functional groups Y present in the polymer component A.

A pressure-sensitive adhesive of this kind is to be presented as being in accordance with the invention particularly if it is obtainable by the processes described as being in accordance with the invention.

The invention additionally provides for the use of surface-modified particles having a nonpolymeric base unit, particularly of particles of the kind described in the context of this specification, as crosslinking reagents of polymers for preparing pressure-sensitive adhesives.

Also considered as being in accordance with the invention are the polymers A which have as yet not been crosslinked but have been admixed with the functionalized particles B. In the pressure-sensitive adhesive to be crosslinked there may be further components present.

The PSA formulations of the invention comprise at least one kind of a polymer A which contains at least one kind of groups of type Y, and also at least one kind of filler particles B containing on their surface at least one kind of groups of type X. Groups of type Y and of type X have been selected for the purposes of this invention such that exposure to electromagnetic radiation, particulate radiation and/or thermal energy forms a bond between at least one group of type Y and at least one functional group of type X, thereby producing an adduct of type B—X'—Y'-A (see FIG. 2). The designation X' here denotes that the structure of the functional group X may have altered following reaction. Similarly, the designation Y' indicates that the structure of the functional group Y may have altered following reaction. It is likewise in accordance with the invention for the functional groups X and Y not to have altered in their structure and yet still to have entered into a linkage.

In this description the terms "electromagnetic radiation" and "particulate radiation" are to be understood to mean all forms of radiation, a summary having been given by V. D. McGinniss [V. D. McGinniss in Encyclopedia of Polymer Science and Engineering, H. F. Mark, N. M. Bikales, C. G. Overberger, G. Menges (eds.), 2nd ed., 1986, Wiley, New York, vol. 4, p. 418ff]. These radiation forms can be employed with preference in accordance with the invention.

Through the inventive use of the innovative formulations described here, in combination with the process described here, advantageously crosslinked PSAs are obtained. The functionalized filler particles B act as polyfunctional crosslinkers. As a result of their capacity to link two or more polymer chains in one crosslinking point it is possible to reduce the molar mass of the polymeric constituents of the PSA that are to be crosslinked (on the basis of polymeric constituents for the PSA which—in relation to customary, prior-art processes—have a reduced molar mass). There follows an improvement in the processing characteristics. Conversely, within the context of this invention, it is also possible to admix the filler particles of the invention to PSAs which comprise crosslinkable polymers of low molar mass. Following exposure to electromagnetic radiation, particulate radiation and/or thermal energy, different network structures are obtained than if the filler particles of the invention had not been present. A feature of this innovative state of crosslinking is that it correlates with improved product properties, particularly an increased cohesion of the PSA. Typically it is characteristic of the innovative state of crosslinking that the adhesive properties of the PSAs of the invention are at least at the level also occupied by a crosslinked PSA which contains no inventive filler particles but has been processed in a comparable way and has a comparable gel fraction.

An advantageous approach is for the PSA formulations of the invention, comprising at least one kind of an inventive polymer A and at least one kind of a functionalized filler particle B, to have good processing properties in the raw state—that is, before processing commences. By processing properties for the purposes of this invention are meant in particular the viscosity of the PSA formulation and also its elasticity. The viscosity is reported as zero-shear viscosity $\eta_0$ for different temperatures. It can be obtained from viscosity curves determined by capillary viscosymmetry. The elasticity is reported in the form of the first normal stress difference $N_1$, again at different temperatures. The data for the first normal stress difference, too, can be obtained from capillary viscosymmetry experiments. Both variables, the viscosity and the first normal stress difference, are generally dependent on shear rates for PSA formulations. Depending on process and the shear rates which occur therein, therefore, they may vary for a given PSA formulation. For the description of this invention it is sensible to limit oneself to one shear rate; however, this does not restrict in this respect the processes which can be used in accordance with the invention. As one such shear rate the shear rate of $1000\ s^{-1}$ is selected as a representative, advantageous value. For the processing properties and particularly the coatability it is very advantageous not to exceed a defined ratio of elasticity and viscosity at the shear rate dictated by the process. If this ratio is too high, the elastic character of the material to be coated is predominant. A consequence of that can be melt fracture, which is manifested in a non-homogeneous coating pattern (M. Pahl, W. Gleißle, H.-M. Laun, Praktische Rheologie der Kunststoffe und Elastomere, 4th ed., 1995, VDI Verlag, Düsseldorf, p. 191f).

In accordance with information gained from capillary-viscosimetric rheology, the ratio $R=N_1/\tau$ of first normal stress difference $N_1$ and shear stress $\tau$ determines the processing characteristics of a polymer melt [W. Gleißle, *Rheol. Acta*, 1982, 21, 484-487; M. Pahl, W. Gleißle, H.-M. Laun, Praktische Rheologie der Kunststoffe und Elastomere, 4th ed., 1995, VDI Verlag, Düsseldorf, p. 320ff]. The shear stress $\tau$ is the product of viscosity and shear rate. The numerator of the ratio $N_1/\tau$ hence describes the elastic properties of the material, the denominator the viscous properties. The latter, moreover, illustrates the dependence on the operating speed in the form of the shear rate. Above a critical rate for R, flow anomalies occur. If, therefore, at the shear rates which prevail during processing, success is achieved in reducing $N_1$ by a design of material, or at least in not causing it to grow further as a result of additional crosslinking effects, the expectation is then that the material will be able to be coated without melt inhomogeneities. This can be accomplished, for example, by not initiating crosslinking until after coating, such as is possible, for example, in the case of radiation treatment. The irradiated and thus crosslinked material has an increased elasticity and, in association with this, a higher first normal stress difference, and in this state could not be processed with a good coating pattern. The uncrosslinked melt, however, is less elastic, exhibits a lower first normal stress difference, and can be coated successfully. For PSAs with good cohesion there is frequently a need for polymers having high molar masses. These polymers, however, may have high elasticities even in the chemically uncrosslinked state, owing to intermolecular interactions, such as interlooping, and this may lead to disadvantages in the coating characteristics.

The innovative concept of the invention encompasses accomplishing the cohesion of the PSA of the invention essentially by means of an improved state of crosslinking via chemical linking of polymers to filler surfaces. A high polymer molar mass is therefore no longer mandatory and, consequently, the coating characteristics are not so pronouncedly restricted as a result of chain interlooping. The particles themselves, during processing, are in the form of a disperse phase in the PSA formulation. Since at this time they have not yet undergone chemical linkage with polymeric constituents of the formulation, at this time their contribution to the elasticity of the formulation is incomplete. Only when the crosslinking reaction is initiated, during and/or after coating, is the desired cohesion produced. The requirements imposed on the PSA formulations of the invention are therefore that the formulation in the uncrosslinked state should exhibit good processing properties, provided for example by a low first normal stress difference, and in particular the ratio R, and in the crosslinked state should exhibit good cohesion, provided for example by the holding power or the gel fraction of a self-adhesive tape test specimen.

Advantageous PSAs of the invention, obtained by way of the inventive coating and crosslinking operation, typically have a holding power according to test D that is at least 50% higher, preferably at least 100% higher, than that of a formulation coated and crosslinked in exactly the same way but containing no filler particles of the invention and yet having a comparable gel fraction (test B). The adhesion, given by the bond strength according to test C, of the PSA system of the invention is typically at least at the same level occupied by that of the aforementioned reference system, or preferably is in fact at least 25% higher. At the same time, the R value of the inventive PSA in the uncrosslinked state, at a temperature which is appropriate in a way that is specific to the particular material, of between 25° C. and 300° C., exhibits virtually no increase, likewise in comparison to a formulation that contains no filler particles of the invention and is also uncrosslinked, and remains at values of preferably not more than R=3.5 (test A2). The viscosity of the PSAs of the invention at the same temperature is no higher or only slightly higher, specifically not more than, preferably, 25% higher, than that of a formulation that contains no filler particles of the invention and is also uncrosslinked (test A1).

Composition of Inventive PSA Formulations

The PSA formulations of the invention comprise at least one kind of polymer, A, and at least one kind of filler particle, B, the at least one polymer kind A being able, via groups Y present in it, to join with groups X, located on the surface of the at least one filler particle kind B, through exposure to electromagnetic radiation, particulate radiation and/or thermal energy during and/or after a coating operation. The PSA of the invention may optionally comprise further constituents in addition to polymers A and filler particles B. This section will address the polymers A of the invention, the fillers B of the invention, and further constituents which may be used optionally in the PSA formulations of the invention, and will also describe the nature of the groups X and Y.

The PSAs of the invention contain advantageously up to 50% by weight of at least one filler particle kind B, preferably up to 20% by weight, very preferably up to 12% by weight.

Polymers A

The at least one polymer kind A is preferably in accordance with the invention when it has a molar mass of not more than 10 000 000 g/mol, preferably not more than 500 000 g/mol. Furthermore, the at least one polymer kind A preferably has a softening temperature of less than 100° C., more preferably less than 20° C. The at least one polymer kind A may be of linear, branched, star-shaped or grafted structure, to give but a few examples, and may be in the form of a homopolymer or random copolymer. The term "random copolymer" encompasses for the purposes of this invention not only copolymers in which the comonomers used for the polymerization have been incorporated in purely random fashion but also those in which there are gradients in the comonomer composition and/or local accumulations of individual comonomer kinds in the polymer chains.

The molar mass is to be understood in this context as referring to the weight average of the molar mass distribution, as is obtainable, for example, via gel permeation chromatography analyses. By softening temperature in this context is meant the glass transition temperature for amorphous systems and the melting temperature for semicrystalline systems, and may be determined, for example, by dynamic differential calorimetry (DSC). Where numerical values are given for softening temperatures, they relate in the case of amorphous systems to the middle-point temperature of the glass stage and in the case of semicrystalline systems to the temperature at maximum heat evolution during the phase transition.

Within the sense of this invention it is possible, moreover, for the at least one polymer kind A to be a block copolymer. Of particular advantage are block copolymers in which, preferably, each of the blocks present (independently of one another) has a molar mass of less than 1 000 000 g/mol, preferably less than 250 000 g/mol, is of linear, branched, star-shaped or grafted structure and/or is in the form of a homopolymer or random copolymer. With further advantage at least one kind of block has a softening temperature of less than 100° C., preferably less than 20° C. The individual kinds of block occurring in the block copolymer may differ with regard to the comonomer composition and optionally may differ in their molar mass and/or softening temperature and/or structure (e.g., linear or branched identity). The different polymer arms in star-shaped and grafted systems may be chemically different in nature: that is, may be composed of different monomers and/or may have a different comonomer composition.

Polymers of kind A are also preferred in accordance with the invention when they contain at least one kind of groups Y which are able to enter into a bond, during or after a coating operation, with groups X present on the surface of the at least one filler particle kind B, on exposure to electromagnetic radiation, particulate radiation and/or thermal energy. The groups of the at least one kind Y may be present in a diversity of ways in the at least one polymer kind A. The at least one polymer kind A may be constructed, for example, as a homopolymer from monomers which contain the at least one kind of groups Y. Furthermore, the at least one polymer kind A may also be constructed as a random copolymer which is obtained at least from one kind of monomers which contain the at least one kind of groups Y and, optionally, from one or more kinds of monomers which contain no such groups. A further possibility is for the at least one polymer kind A to contain the at least one kind of groups Y only at certain points along the polymer backbone. Examples of such embodiments include groups which are located at chain ends, in the region of chain points or blocking-agent points, in the region of branching points or in the region of block connection points. Polymers of the at least one kind A are particularly preferred in accordance with the invention when the polymer molecule contains on average at least two such groups. It is possible, furthermore, for the at least two groups Y to be introduced into the at least one polymer A by way of a grafting reaction. It is likewise in accordance with the invention to introduce the at least two groups Y into the at least one polymer kind A by carrying out a polymer-analogous reaction. Furthermore, any desired combinations of the stated modes of functionalization are in accordance with the invention.

As examples of polymers A, but without wishing to impose any restriction, mention may be made of the following homopolymers and random copolymers as being advantageous for the purposes of this invention: polyethers, such as polyethylene glycol, polypropylene glycol or polytetrahydrofuran, polydienes, such as polybutadiene or polyisoprene, hydrogenated polydienes, such as polyethylene-butylene or polyethylene-propylene, rubbers, such as natural rubber, nitrile rubber or chloroprene rubber, butadiene rubber, isoprene rubber, and polyisobutylene, polyolefins, such as ethylene homopolymers or copolymers, propylene homopolymers or copolymers, metallocene-catalyzed polyolefins, polysiloxanes, polyalkyl vinyl ethers, polymers of unfunctionalized $\alpha,\beta$-unsaturated esters, copolymers based on $\alpha,\beta$-unsaturated esters, copolymers based on alkyl vinyl ethers, and also ethylene-vinylacetate copolymers, EPDM rubbers, and styrene-butadiene rubbers. Further random copolymers which can be used with advantage are obtained by copolymerizing isoprene and/or butadiene, feature 1,4, 1,2 and/or 3,4, or 1,4 and/or 1,2, incorporation of the monomers into the polymer chain, and may be in fully or partly hydrogenated form.

Copolymers which can be used with particular advantage for the purposes of this invention are random copolymers based on unfunctionalized $\alpha,\beta$-unsaturated ethers. When they are used for the at least one polymer kind A with copolymer character, then monomers which can be used for their preparation are, advantageously, in principle all compounds familiar to the skilled worker that are suitable for polymer synthesis. Preference is given to using $\alpha,\beta$-unsaturated alkyl esters of the general structure

$$CH_2=CH(R^1)(COOR^2) \qquad (I)$$

where $R^1$=H or $CH_3$ and $R^2$=H or represents linear, branched or cyclic, saturated or unsaturated alkyl radicals having 1 to 30, in particular having 4 to 18, carbon atoms.

Monomers which can be used with great preference in the sense of general structure I for polymers A with copolymer character include acrylic and methacrylic esters with alkyl groups consisting of 4 to 18 carbon atoms. Specific examples of such compounds, without wishing to be restricted by this enumeration, include n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, n-nonyl acrylate, n-nonyl methacrylate, n-decyl acrylate, n-decyl methacrylate, dodecyl acrylate, dodecyl methacrylate, hexadecyl acrylate, hexadecyl methacrylate, octadecyl acrylate, octadecyl methacrylate, their branched isomers, such as sec-butyl acrylate, sec-butyl methacrylate, tert-butyl acrylate, tert-butyl methacrylate, 2-ethylhexyl acrylate, 2-ethylhexyl methacrylate, and isooctyl acrylate, and also cyclic monomers such as, for example, cyclohexyl acrylate, cyclohexyl methacrylate, norbornyl acrylate, norbornyl methacrylate, isobornyl acrylate and isobornyl methacrylate.

Likewise possible for use as monomers for polymers A with copolymer character are acrylic and methacrylic esters which contain aromatic radicals, such as phenyl acrylate, benzyl acrylate, benzoin acrylate, phenyl methacrylate, benzyl methacrylate or benzoin methacrylate.

A further possibility for use in accordance with the invention are ethoxylated and propoxylated acrylates and methacrylates. In systems of this kind the acrylate or methacrylate side chains are composed formally of an oligomer or polymer or ethylene oxide or of propylene oxide.

It is additionally possible, optionally, to use vinyl monomers from the following groups: vinyl esters, vinyl ethers, vinyl halides, vinylidene halides, and also vinyl compounds containing aromatic rings and heterocycles in a position. For the vinyl monomers which can be employed optionally, mention may be made by way of example of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, and $\alpha$-methylstyrene.

In one preferred version of this invention the at least one polymer kind A contains its at least two groups Y in the form of at least one specific comonomer which has been randomly copolymerized during the polymerization of the polymer. The molar fraction (chemical amount fraction) of this at least one specific comonomer in relation to the composition of the total monomer mixture during the preparation of the total polymer is up to 50% by weight, preferably up to 20% by weight, very preferably up to 5% by weight. The specific character of this at least one comonomer is expressed in the fact that it carries at least one group Y which is able to enter into a bond, during or after a coating operation, with at least one group X, located on the surface of the at least one filler particle kind B, on exposure to electromagnetic radiation, particulate radiation and/or thermal energy. Examples of groups X and Y are described in the section "Combinations of groups X and Y". Particular preference is given to using monomers based on $\alpha,\beta$-unsaturated esters which contain these groups. It is also possible for groups Y to be joined by way of a polymer-analogous reaction with the polymer A at the sites at which these specific comonomers have been incorporated. A further possibility is for these specific comonomers to be derivatized with groups Y prior to polymerization; in other words, for comonomers with functionalization which is not necessarily in accordance with the invention to be modified, prior to polymerization and hence preparation of a polymer kind of type A, with a chemical assembly via which the at least one inventive group Y is incorporated into the comonomer and, following this modification reaction and subsequent polymerization, is available for the forming of a linkage, in accordance with the invention, with at least one group X.

As examples of comonomers which carry functional groups, mention may be made—without wishing to impose any restriction—of allyl acrylate, allyl methacrylate, tetrahydrofurfuryl acrylate, tetrahydrofurfuryl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, glycidyl acrylate, glycidyl methacrylate, acrylated benzophenone, methacrylated benzophenone, crotonic acid, maleic acid, maleic anhydride, itaconic acid, itaconic anhydride, 2-dimethylaminoethyl acrylate, 2-dimethylaminoethyl methacrylate, 3-dimethylaminopropyl acrylate, 3-dimethylaminopropyl methacrylate, N-tert-butylacrylamide, N-tert-butylmethacrylamide, N-isopropylacrylamide, N-isopropylmethacrylamide, acrylamide, methacrylamide, N-methylolacrylamide, N-methylolmethacrylamide, acrylic acid, methacrylic acid, vinyl alcohol, 2-hydroxyethyl vinyl ether, 3-hydroxypropyl vinyl ether, 4-hydroxybutyl vinyl ether and allyl glycidyl ether.

If the at least one polymer kind A is a block copolymer then in the simplest case the copolymers present are diblock copolymers of the form PA-PA', composed of a block PA and a block PA', which differ in respect of the starting monomers selected and may optionally be different in their softening temperature and/or molar mass and/or structure (e.g., linear or branched). Further embodiments of polymers A with block copolymer character, without wishing to impose any restriction, are triblock copolymers of the type PA-PA'-PA", block copolymers of the type PA-PA'-PA"-PA', and higher block copolymers whose structures continue this series. Triblock copolymers and higher block copolymers are in accordance with the invention, in the sense of polymers A with block copolymer character, when all blocks linked directly to one another are different in respect of the selected starting monomers and also, optionally, in their molar mass and/or softening temperature and/or structure (e.g., linear or branched). Further, triblock copolymers and higher block copolymers are in accordance with the invention, in the sense of polymers A, if two or more of the blocks which are not linked directly to one another are not different from one another in respect of the selected starting monomers and also, optionally, in their molar mass and/or softening temperature and/or structure (e.g., linear or branched). A preferred version of a polymer A with block copolymer character is a triblock copolymer of the type PA-PA'-PA", where PA and PA" are identical in respect of the selected starting monomers, molar mass, softening temperature, and structure. The block linkage in polymers A with block copolymer character may take a linear form or alternatively a star-shaped embodiment, or a graft copolymer variant. Each individual block may be constructed as a homopolymer block or copolymer block. The blocks are therefore subject to the same definitions as given in the section "Homopolymers" and "Random copolymers".

Where a block copolymer is employed as polymer A, then preferably at least one kind of block contains functionalizations of type Y. Particular preference is given to diblock copolymers which contain functionalizations of type Y in only one kind of block; symmetrical triblock copolymers which contain functionalizations of type Y only in two end blocks; and triblock copolymers which contain functionalities of type Y only in the middle block.

Filler Particles B

As the at least one filler particle kind B for the purposes of this invention use is made preferably of filler particles in which the base units without surface modifications have softening temperatures of greater than 200° C., preferably of greater than 500° C. Furthermore, systems of the kind whose softening temperature (based on the unmodified base units) is above the decomposition temperature are in accordance with the invention when the decomposition temperature is above 200° C., preferably above 500° C.

The materials on which the base unit of the at least one filler particle kind B is based may be inorganic in nature or may be an organic/inorganic hybrid material and may have an amorphous, partly crystalline or crystalline character. Base units of organic nature can also be used for the purposes of the invention.

In terms of their structure, the filler particles may be present preferably in spherical form, rodlet form or platelet form. Separate particles, often also called primary particles, are in accordance with the invention just as much as aggregates formed from a plurality of primary particles. Such systems often exhibit a fractal superstructure. Where the particles are formed from crystallites, the primary particle form depends on the nature of the crystal lattice. Platelet-form systems can also be present in the form of layer stacks.

In one advantageous embodiment of this invention the at least one functionalized filler kind is present in the pressure-sensitive adhesive substantially in the form of singular spherical particles. In that case the particle diameters have values of less than 500 nm, preferably of less than 100 nm, very preferably of less than 25 nm. In a further advantageous version of this invention the at least one functionalized filler kind is present in the pressure-sensitive adhesive substantially in the form of singular platelet-shaped particles. The layer thickness of such platelets then has values of preferably less than 10 nm and a greatest diameter of preferably less than 1000 nm. In a further advantageous version of this invention the at least one filler kind is present in the pressure-sensitive adhesive substantially in the form of singular rodlet-shaped particles. In this case these rodlets have a diameter of less than 100 nm and a length of less than 15 µm. The rodlets may also be curved and/or flexible. Furthermore, it is possible with advantage for the purposes of this invention for the at least one filler kind to be present in the pressure-sensitive adhesive in the form of primary particle aggregates. These aggregates have a gyration radius (to be understood in analogy to the term "radius of gyration" as known from polymers) of less than 1000 nm, preferably of less than 250 nm. Particular preference is given for the purposes of this invention to using filler particles of the kind whose spatial extent in at least one direction is less than 250 nm, preferably less than 100 nm, very preferably less than 50 nm. It is possible for the purposes of this invention, furthermore, to use combinations of the aforementioned types of filler.

Typical classes of compound, advantageous in accordance with the invention, of which the base unit of the at least one filler particle kind B is composed are oxides of inorganic nature—particularly metal oxides and/or semimetal oxides—salts of alkaline earth metals, and silicate-based minerals, especially clay minerals and clays. The amorphous or crystalline metal oxides that can be used in accordance with the invention include, for example, silicon dioxide, aluminum oxide, titanium dioxide, zirconium dioxide, and zinc oxide. The skilled worker is familiar with further systems, which may likewise be used in accordance with the invention. Alkaline earth metal salts include, for example, carbonates, sulfates, hydroxides, phosphates, and hydrogen phosphates of magnesium, of calcium, of strontium, and of barium. The clay minerals and clays which can be used in accordance with the invention include, in particular, silicatic systems such as serpentines, kaolins, talc, pyrophyllite, smectites such as particularly montmorillonite, vermiculites, illites, mica, brittle mica, chlorites, sepiolite, and palygorskite. Additionally it is possible to use synthetic clay minerals such as hectorites and also systems related thereto, such as Laponite® from Laporte, and fluorohectorites and systems related thereto, such as Somasif® from Co-Op, in accordance with the invention.

The at least one filler particle kind B is in a surface-modified form. Surface modification reagents that are typical and advantageous in accordance with the invention are organosilanes and surfactants, but also organotitanium compounds, fatty acids or polyelectrolytes such as, for example, short-chain polymers having a high acrylic acid fraction. The primary function of these surface modification reagents is to create compatibility between the particle surface and the matrix into which the particles are to be dispersed. As a further function, surface modification reagents are used in order to prevent relatively small particles coming together to form larger objects. It is very advantageous for the purposes of the invention to use at least one kind of surface modification reagent which in addition to the compatibilizing and aggregation-preventing function also affords the possibility of entering, via at least one group X incorporated in the at least one kind of surface modification reagent, into a connection with at least one group Y, present in at least one polymer kind A, on exposure to electromagnetic radiation, particulate radiation and/or thermal energy, during or after a coating operation. A filler particle carries on its surface preferably at least 10 groups of the at least one kind X, more preferably at least 50.

Filler particles which in their natural form (in the form of the base unit without surface modification) contain hydroxide groups on the surface afford the possibility, preferably, of a reaction with chlorosilanes or alkoxysilanes. Hydrolysis of the silane is followed by condensation of silanol groups with the hydroxide groups on the particle surface. If at least one substituent on the central silicon atom of the silane is an organic radical, then in the case of complete surface coverage with silane molecules an organophilic casing is linked covalently in this way to the filler particle, and hence the particles are made compatible with the polymer matrix. The concepts and typically used classes of material which can be employed for the purposes of this invention are described, for example by R. N. Rothon [R. N. Rothon (ed.), "Particulate-Filled Polymer Composites" 2nd ed., 2003, Rapra Technology, Shawbury, 153-206].

Two classes of silanes can be distinguished in particular for the purposes of this invention: on the one hand, those which, in addition to the groups capable of reaction with the base surface, carry exclusively organic radicals which are chemically inert (see structure II); on the other, those which, in addition to the groups capable of reaction with the base surface, contain at least one organic radical which carries at least one group X that is able to enter into a bond with at least one group Y present in at least one polymer kind A on exposure to electromagnetic radiation, particulate radiation and/or thermal energy, during or after a coating operation (see structure III). In silane II at least one of substituents A, B, and D is a hydrolyzable group, i.e., a chlorine atom or an alkoxy group, for example. At least one of substituents B, C, and D is an organic radical which is composed of a linear, branched or cyclic hydrocarbon, which may also be aromatic and is of low molecular mass or oligomeric or polymeric in nature. If there is more than one hydrolyzable group among substituents A, B, and D, then the groups involved may be chemically identical or different, or meeting the above definition of hydrolyzable groups. If there is more than one organic radical among substituents B, C, and D, then these radicals may likewise be chemically identical or different, or meeting the above definition of organic radicals. In silane III at least one of substituents A, E, and F is a hydrolyzable group, i.e., a chlorine atom or an alkoxy group, for example. At least one of substituents E, F, and G is an organic radical which is composed of a linear, branched or cyclic hydrocarbon, which may also be aromatic and is of low molecular mass or oligomeric or polymeric in nature and which additionally contains at least one group X which is able, during or after a coating operation, to enter into a bond with at least one group Y present in at least one polymer kind A on exposure to electromagnetic radiation, particulate radiation and/or thermal energy. If there is more than one hydrolyzable group among substituents A, E, and F, then the groups involved may be chemically identical or different. If there is more than one organic radical among substituents E, F, and G, then the radicals involved may likewise be chemically identical or different, or meeting the above definition of organic radicals.

Advantageous embodiments of silanes of structure II that are useful in accordance with the invention are those in which only A is employed as a hydrolyzable group and B, C, and D are organic radicals, of which B and D are chemically identical and C is chemically different. Further advantageous embodiments of silanes of structure II that are useful in accordance with the invention are those in which A and B are employed as chemically identical hydrolyzable groups and C and D are chemically identical organic radicals. Further advantageous embodiments of silanes of structure II that are useful in accordance with the invention are those in which A, B, and D are employed as chemically identical hydrolyzable groups and C is an organic radical.

Advantageous embodiments of silanes of structure III that are useful in accordance with the invention are those in which only A is employed as a hydrolyzable group and E, F, and G are organic radicals, of which E and F are chemically identical and G is chemically different. G contains the at least one group X which, during or after a coating operation, is able to enter into a bond with at least one group Y present in at least one polymer kind A on exposure to electromagnetic radiation, particulate radiation and/or thermal energy. Further advantageous embodiments of silanes of structure III that are useful in accordance with the invention are those in which A, E, and F are employed as chemically identical hydrolyzable groups and G is an organic radical which contains the at least one group X which, during or after a coating operation, is able to enter into a bond with at least one group Y present in at least one polymer kind A on exposure to electromagnetic radiation, particulate radiation and/or thermal energy.

Hydrolyzable groups A, B, D, E, and F which may be employed with advantage in silanes II and silanes III are halogen atoms, especially chlorine, and/or alkoxy groups, such as methoxy, ethoxy, n-propoxy, isopropoxy, n-butoxy, sec-butoxy or tert-butoxy groups. Acetoxy groups are a further possibility for use. The additional examples of hydrolyzable groups, known to the skilled worker, may likewise be employed for the purposes of this invention.

The organic radicals B, C, D, E, and F which may be employed in silanes II and silanes III include by way of example, with no claim to completeness, methyl, ethyl, n-propyl, isopropyl, n-butyl, sec-butyl, and tert-butyl groups, pentyl groups and also the branched isomers, hexyl groups and also the branched isomers, heptyl groups and also the branched isomers, octyl groups and also the branched isomers, nonyl groups and also the branched isomers, decyl groups and also the branched isomers, undecyl groups and also the branched isomers, dodecyl groups and also the branched isomers, tetradecyl groups and also the branched isomers, hexadecyl groups and also the branched isomers, octadecyl groups and also the branched isomers, and eicosyl groups and also the branched isomers. The organic radicals of the invention may, furthermore, contain cyclic and/or aromatic moieties. Representative structures are cyclohexyl, phenyl, and benzyl groups. It is further in accordance with the invention if as at least one organic radical use is made of oligomers or polymers which contain at least one hydrolyzable silyl group.

The organic radicals E, F, and G in which there is at least one group X which, during or after a coating operation, is able to enter into a bond with at least one group Y present in at least one polymer kind A on exposure to electromagnetic radiation, particulate radiation and/or thermal energy include, for example, the compounds compiled in the following list (the list makes no claim to completeness): methyl, ethyl, n-propyl, isopropyl, n-butyl, sec-butyl, and tert-butyl groups, pentyl groups and also the branched isomers, hexyl groups and also the branched isomers, heptyl groups and also the branched isomers, octyl groups and also the branched isomers, nonyl groups and also the branched isomers, decyl groups and also the branched isomers, undecyl groups and also the branched isomers, dodecyl groups and also the branched isomers, tetradecyl groups and also the branched isomers, hexadecyl groups and also the branched isomers, octadecyl groups and also the branched isomers, and eicosyl groups and also the branched isomers. The organic radicals of the invention may, furthermore, contain cyclic and/or aromatic moieties. Representative structures are cyclohexyl, phenyl, and benzyl groups. It is further in accordance with the invention if as at least one organic radical use is made of oligomers or polymers which contain at least one hydrolyzable silyl group. Where a radical from the above list is employed as one or more of radicals E, F, and G, it is additionally modified by a chemical moiety which contains at least one group X.

Examples of silanes of structure II that can be used with preference for the purposes of this invention are methyltrimethoxysilane, methyltriethoxysilane, dimethyldimethoxysilane, dimethyldiethoxysilane, trimethylethoxysilane, ethyltrimethoxysilane, propyltrimethoxysilane, propyltriethoxysilane, isobutyltrimethoxysilane, isobutyltriethoxysilane, octyltrimethoxysilane, octyltriethoxysilane, isooctyltrimethoxysilane isooctyltriethoxysilane, hexadecyltrimethoxysilane, hexadecyltriethoxysilane, octadecylmethyldimethoxysilane, phenyltrimethoxysilane, phenyltriethoxysilane, cyclohexylmethyldimethoxysilane, and dicyclopentyldimethoxysilane.

An example of silyl-functionalized oligomers or polymers which can be employed in accordance with the invention is polyethylene glycol which has been linked with a trimethoxysilane group.

Representatives of silanes of structure III which can be used with particular preference for the purposes of this invention and which carry at least one functionalization are, for example, N-(2-aminoethyl)-3-aminopropyltrimethoxysilane, N-(2-aminoethyl)-3-amino-propyltriethoxysilane, 3-aminopropyltrimethoxysilane, 3-aminopropyltriethoxysilane, 3-aminopropyldiethoxymethylsilane, N-(2-aminoethyl)-3-aminopropyldimethoxymethylsilane, (N-butyl)-3-aminopropyltrimethoxysilane, 3-(N-ethylamino)-2-methylpropyltrimethoxysilane, 4-amino-3,3-dimethylbutyltrimethoxysilane, 4-amino-3,3-dimethylbutyldimethoxymethylsilane, (N-cyclohexyl)aminomethyldimethoxymethylsilane, (N-cyclohexyl)-aminomethyltrimethoxysilane, (N-phenyl)-3-aminopropyltrimethoxysilane, (N-phenyl)aminomethyldimethoxymethylsilane, (N-benzyl-2-aminoethyl)-3-aminopropyltrimethoxysilane[2-(N-benzyl-N-vinylamino) ethyl]-3-aminopropyltrimethoxysilane hydrogen chloride, [2-(N-benzyl-N-vinylamino)ethyl]-3-aminopropyltrimethoxysilane, bis(3-propyltriethoxysilyl)amine, vinyltrimethoxysilane, vinyltriethoxysilane, vinyltri(2-methoxyethoxy)silane, vinyltriisopropoxysilane, vinyldimethoxymethylsilane, vinyltriacetoxysilane, 3-triethoxysilylpropylsuccinic anhydride, 3-glycidyloxypropyltrimethoxysilane, 3-glycidyloxy-propyltriethoxysilane, 2-(3, 4-epoxycyclohexyl)ethyltriethoxysilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-isocyanatopropyltrimethoxysilane, 3-isocyanatopropyltriethoxysilane, isocyanatomethyltrimethoxysilane, isocyanatomethyldimethoxymethylsilane, tris[3-(trimethoxysilyl)propyl] isocyanurate, 3-ureidopropyltrimethoxysilane, 3-ureidopropyltriethoxysilane, 2-hydroxy-4-(3-triethoxysilylpropoxy)benzophenone, 4-(3'-chlorodimethylsilylpropoxy)benzophenone, 3-mercaptopropyltrimethoxysilane, 3-mercaptopropyldimethoxymethylsilane, bis(3-triethoxysilylpropyl)disulfane, bis(3-triethoxysilylpropyl)tetrasulfane, bis(triethoxysilylpropyl)polysulfane, and octadecylaminodimethyltrimethoxysilylpropylammonium chloride.

Silanes which are disclosed in WO 00/43539 by Biochip Technologies or in EP 281 941 B1 by Ciba Geigy, and those published by Kolar et al. [A. Kolar, H. F. Gruber, G. Greber, *JMS Pure Appl. Chem.*, 1994, A31, 305-318], may likewise be employed for the purposes of this invention as silanes of structure III. It is also possible to use organic titanium compounds, optionally in conjunction with silanes.

It is likewise of advantage in accordance with the invention to use silanes of structure III which have been derivatized with a chemical assembly which contains at least one group X. By this is meant that silanes of structure III with non inventive functionalization are modified, before and/or after the surface modification reaction with the filler particles, with a chemical assembly which introduces the at least one inventive group X into the silane and after this silane modification reaction and the surface modification reaction is available to form a bond with at least one group Y.

The surface modification may take place completely by means of at least one representative of the silanes III. It is also possible, though, to use a combination of silanes III and silanes II.

Such a combination is inventive if at least 1% by weight, preferably at least 5% by weight, of at least one representative of the silanes III is used.

Silanes are used with particular preference for the purposes of this invention as surface modifiers if filler particles are employed which, at least in the state of the non-surface-modified base unit, carry hydroxyl groups on the surface. Examples of this kind of filler particles are metal oxides, especially amorphous silicon dioxide. An exemplary possibility of realizing a surface modification is given by Bauer and coworkers (F. Bauer, H. Ernst, U. Decker, M. Findeisen, H.-J. Gläsel, H. Langguth, E. Hartmann, R. Mehnert, C. Peuker, *Macromol. Chem. Phys.*, 2000, 201, 2654-2659] and Rothon [R. N. Rothon (ed.), Particulate Filled Polymer Composites, 2nd ed., 2003, Rapra Technology, Shawbury, pp. 153-206].

Particles which in the state of the non-surface-modified base unit carry ionic groups on the surface can be modified preferably using surfactants and/or fatty acids.

As surfactants it is possible in general to employ all quaternary ammonium compounds, protonated amines, organic phosphonium ions, and amino carboxylic acids that exhibit amphiphilic behavior. Advantageous use may be made of ammonium compounds which carry at least three organic radicals, such as alkylammonium salts, trimethylalkylammonium salts, dimethyldialkylammonium salts, methylbenzyldialkylammonium salts, dimethylbenzylalkylammonium salts or alkylpyridinium salts. Furthermore, alkoxylated quaternary ammonium compounds may be employed.

Two classes of surfactants may be distinguished for the purposes of this invention: on the one hand, those which, in addition to the groups capable of interaction with the base surface, carry exclusively organic radicals which are chemically inert (see structure IV); on the other, those which, in addition to the groups capable of linking with the base surface, contain at least one organic radical which carries at least one group X which, during or after a coating operation, is able to enter into a bond with at least one group Y present in at least one polymer kind A on exposure to electromagnetic radiation, particulate radiation and/or thermal energy (see structure V). In surfactant IV the substituents A, B, and D may independently of one another be organic radicals or hydrogen; the substituent C is a long-chain organic radical. Any anions can be employed as counterions. Examples are chloride, bromide, hydrogen sulfate, dihydrogen phosphate, and tetrafluoroborate. The skilled worker is aware of others which may likewise be employed for the purposes of this invention. Independently of one another, the organic radicals may be linear or branched, saturated or unsaturated, may be composed of aliphatic, olefinic and/or aromatic elements, and may contain 1 to 22 carbon atoms. Typical substituents used as organic radicals include methyl groups, ethyl groups, n-propyl groups, isopropyl groups, n-butyl groups, sec-butyl groups, tert-butyl groups, linear or branched pentyl groups, linear or branched hexyl groups, linear or branched heptyl groups, linear or branched octyl groups, benzyl groups, or groups with higher numbers of carbon atoms. Long-chain organic radicals employed include, preferably, dodecyl groups, tetradecyl groups, hexadecyl groups, octadecyl groups or eicosyl groups in saturated or unsaturated form. Since the starting materials for surfactant manufacture are frequently natural products, alkyl substituents with only one length of chain are rarely encountered. Instead there is frequently a mixture of alkyl chains different in length. Particularly preferred long-chain organic radicals used are tallow radicals (unsaturated) or hydrogenated tallow radicals (saturated). It is also in accordance with the invention for the surfactant function to be taken on by oligomers or polymers which have been functionalized such that they carry at least one cationic group.

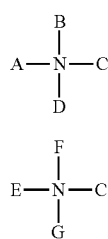

(IV)

(V)

Examples which may be used with preference for the purposes of this invention as surfactants of structure IV are hexadecyltrimethylammonium chloride or bromide, methylditallowylammonium chloride or bromide, in which the tallow radicals ("tallowyl") may be saturated or unsaturated, dimethyltallowylbenzylammonium chloride or bromide, in which the tallowyl radicals may be saturated or unsaturated, dimethyltallowyl(2-ethylhexyl)ammonium chloride or bromide, in which the tallowyl radicals may be saturated or unsaturated, and dimethylditallowylammonium chloride or bromide, in which the tallowyl radicals may be saturated or unsaturated.

Surfactants which are disclosed in EP 900 260 B1 by Akzo Nobel, U.S. Pat. No. 5,739,087 by Southern Clay, U.S. Pat. No. 5,718,841 by Rheox, U.S. Pat. No. 4,141,841 by Procter & Gamble, and by H Großmann [H. Großmann in Katalysatoren, Tenside and Mineralöladditive, H. Falbe, U. Hasserodt (ed.), 1978. G. Thieme, Stuttgart, p. 135ff] may likewise be employed for the purposes of this invention as surfactants of structure IV.

Advantageous embodiments of surfactants of structure V that are useful in accordance with the invention are those in which the substituents E, F, and G independently of one another may be organic radicals or hydrogen and the substituent C is a long-chain organic radical. Any anions can be employed as counterions. Examples are chloride, bromide, hydrogen sulfate, dihydrogen phosphate, and tetrafluoroborate. Independently of one another, the organic radicals may be linear or branched, saturated or unsaturated, may be composed of aliphatic, olefinic and/or aromatic elements, and may contain 1 to 22 carbon atoms. Typical substituents used as organic radicals include methyl groups, ethyl groups, n-propyl groups, isopropyl groups, n-butyl groups, sec-butyl groups, tert-butyl groups, linear or branched pentyl groups, linear or branched hexyl groups, linear or branched heptyl groups, linear or branched octyl groups, benzyl groups, or groups with higher numbers of carbon atoms. Long-chain organic radicals employed include, preferably, dodecyl groups, tetradecyl groups, hexadecyl groups, octadecyl groups or eicosyl groups in saturated or unsaturated form. With regard to the starting materials for manufacturing surfactant V as well, natural products are frequently employed, so that rarely are alkyl substituents of a single chain length present; instead, a mixture of alkyl chains of different lengths is present. Particularly preferred long-chain organic radicals used are tallow radicals (unsaturated) or hydrogenated tallow radicals (saturated). It is also in accordance with the invention for the surfactant function to be taken on by oligomers or polymers which have been functionalized such that they carry at least one cationic group. With regard to the surfactants V at least one of substituents E, F, G, and C contains at least one group X which, during or after a coating operation, is able to enter into a bond with at least one group Y present in at least one polymer kind A on exposure to electromagnetic radiation, particulate radiation and/or thermal energy. Surfactants disclosed in EP 900 260 B1 by Akzo Nobel, U.S. Pat. No. 5,739,087 by Southern Clay, U.S. Pat. No. 5,718,841 by Rheox, U.S. Pat. No. 4,141,841 by Procter & Gamble, and by H Großmann [H. Großmann in Katalysatoren, Tenside and Mineralöladditive, H. Falbe, U. Hasserodt (ed.), 1978. G. Thieme, Stuttgart, p. 135ff] may likewise be employed for the purposes of this invention as surfactants of structure V, provided they have been modified with at least one group X, in addition, under certain circumstances, to the structure disclosed.

Examples which can be employed with preference for the purposes of this invention as surfactants of structure V are methyltallowyldi(2-hydroxyethyl)ammonium chloride or bromide, allyldimethyltetradecyl chloride or bromide, allyldimethylhexadecylammonium chloride or bromide, and allyldimethyloctadecylammonium chloride or bromide.

For the purposes of this invention it is possible with preference to use a combination of surfactants IV and surfactants V. In this embodiment of the invention, representatives of surfactants V are present at a level of at least 1% by weight, preferably at least 5% by weight, among all of the surfactants employed. Furthermore, it is possible to use surfactants IV or V in combination with cationic compounds which, though not themselves surfactants, carry at least one group X which is able, during or after a coating operation, to enter into a bond with at least one group Y present in at least one polymer kind A on exposure to electromagnetic radiation, particulate radiation and/or thermal energy. At least 1% by weight, preferably at least 5% by weight, of a cationic compound of this kind is used in accordance with the invention in combination with surfactants IV and/or V. Where cationic compounds of this kind are employed, the sum of surfactants IV and V employed is not more than 99% by weight, preferably not more than 95% by weight, it being possible for surfactants V to be replaced entirely by surfactants IV. Examples of such cationic compounds are (2-acryloyloxyethyl)(4-benzoylbenzyl)dimethylammonium chloride or bromide, 3-trimethyl-ammoniopropylmethacrylamide chloride or bromide, 2-trimethylammmonioethyl methacrylate chloride or bromide, 3-dimethylalkylammoniopropylmethacrylamide chloride or bromide, and 2-dimethylalkylammoniomethyl methacrylate chloride or bromide.

Surfactants are used with particular preference for the purposes of this invention if the filler particles employed have negative charges or partial charges on the surface (in the state of the non-surface-modified base unit). Examples of this kind of filler particles are certain clay minerals, particularly smectites, in which intercalated cations may be replaced by surfactants. One principle whereby such replacement may take place has been formulated by Lagaly [G. Lagaly in Tonminerale and Tone, K. Jasmund, G. Lagaly (ed.), 1993, Steinkopff, Darmstadt, p. 366ff].

It is possible, furthermore, to use combinations of inventive silanes and inventive surfactants. At least one of the surface modification reagents employed contains at least one group X which, during or after a coating operation, is able to enter into a bond with at least one group Y present in the polymer kind A on exposure to electromagnetic radiation, particulate radiation and/or thermal energy.

Further Constituents

It is additionally in accordance with the invention to use, optionally, polymers C containing at least one group of type X, and/or polymers C containing at least one group X and at least one group of type Y, and/or polymers C containing neither type-X nor type-Y groups. The composition of those polymers, employable optionally, that contain no groups of type X or Y are subject to the same details in terms of construction, composition, choice of monomers, softening temperature, and structure as contained in the definition of the polymers A, apart from the details given there in respect of groups Y. Optionally employable polymers containing at least one group X are subject to the details given for polymers A, but such polymers C contain groups of kind X and not groups of kind Y and can therefore, during or after a coating operation, enter into a bond with at least one group Y of the at least one polymer of kind A by exposure to electromagnetic radiation, particulate radiation and/or thermal energy. The incorporation of groups X into polymers C is subject to the same details given for groups Y in the polymers A. Where polymers are employed that carry groups X and Y, then the same details, in terms of construction, composition, choice of monomers, softening temperature, and structure, apply as contained in the definition of the polymers A, but with the addition that there is also at least one group X present in the polymer. For the incorporation of groups X and Y into polymers C which carry both kinds of groups, the details which apply are the same as those given for the groups Y in the polymers A.

As further constituents the PSA formulations of the invention may comprise tackifier resins, plasticizers, rheological additives, catalysts, initiators, stabilizers, compatibilizers, coupling reagents, crosslinkers, antioxidants, other aging inhibitors, light stabilizers, flame retardants, pigments, dyes, further fillers, especially those not included in at least one filler particle kind B, and/or expandants.

Combinations of Groups X and Y

The PSAs of the invention comprise at least one polymer kind A and at least one filler particle kind B. Polymers A contain at least two groups Y; filler particles B contain at least one kind of groups X. Groups X and Y are chosen for the purposes of this invention such that between these groups X and Y or by way of these groups X and Y it is possible to bring about coupling between polymers A and filler particles B. The coupling is initiated during or after the coating operation by exposure to electromagnetic radiation, particulate radiation and/or thermal energy. The coupling involves at least one group X and at least one group Y. By coupling of at least one group X and at least one group Y is meant for the purposes of this invention, in particular a chemical reaction in which the at least one group X reacts with the at least one group Y and leads to the formation of a covalent bond, the formation of hydrogen bonds between the at least one group X and the at least one group Y, and/or the formation of a coordinative bond as a result, for example, of formation of a complex, involving the at least one group X and the at least one group Y, so that at least one donor/acceptor bond is formed.

The coupling in this case may take place between the groups X and Y directly or else by mediation through one or more further substances, such as coupling reagents or crosslinkers. The position and number of groups X and Y in the polymers A and filler particles B that can be used in accordance with the invention are subject to the same definitions given for the polymers A and the filler particles B.

Where the coupling of the invention between the at least one polymer kind A and the at least one filler particle kind B is to proceed via the groups Y and X as a chemical reaction, the groups X and Y involved are defined in particular in accordance with the following remarks.

The PSAs of the invention comprise at least one constituent which comprises at least one kind of inventive segments having the general structure $(R^\circ R^{\circ\circ} R^{\circ\circ\circ} C)$—X. $R^\circ$, $R^{\circ\circ}$ and $R^{\circ\circ\circ}$ may independently of one another be saturated or unsaturated, aliphatic or aromatic hydrocarbon radicals which may also be linked to one another and may be identical or different. For the purposes of this invention it is also possible for the carbon atom in $(R^\circ R^{\circ\circ} R^{\circ\circ\circ} C)$—X itself to be unsaturated. In that case said carbon atom is linked only to X and to one or two of the radicals $R^\circ$, $R^{\circ\circ}$ or $R^{\circ\circ\circ}$. The radicals $R^\circ$, $R^{\circ\circ}$, and $R^{\circ\circ\circ}$ may independently of one another include any number of heteroatoms. The radicals $R^\circ$, $R^{\circ\circ}$, and $R^{\circ\circ\circ}$ may be of low molecular mass or may be polymeric in nature. Up to two of the radicals $R^\circ$, $R^{\circ\circ}$, and $R^{\circ\circ\circ}$ may also be hydrogen atoms, moreover. At least one of the radicals $R^\circ$, $R^{\circ\circ}$, and $R^{\circ\circ\circ}$ is linked by a chemical or ionic bond, by chemisorption or physisorption, to a filler particle of kind B. The group needed for the coupling reaction is designated X.

The at least one inventive segment of structure $(R^\circ R^{\circ\circ} R^{\circ\circ\circ} C)$—X can be reacted with at least one segment which is present in at least one further constituent of the PSA of the invention and which has the general structure $(R^* R^{} R^{*} C)$—Y. $R^*$, $R^{}$ and $R^{*}$ may independently of one another be saturated or unsaturated, aliphatic or aromatic hydrocarbon radicals which may also be linked to one another and may be identical or different. For the purposes of this invention it is also possible for the carbon atom in (R*RR*C)—Y itself to be unsaturated. In that case said carbon atom is linked only to Y and to one or two of the radicals R*, R or R*. The radicals R*, R, and R* may independently of one another include any number of heteroatoms. The radicals R*, R, and R* may be of low molecular mass or may be polymeric in nature. Up to two of the radicals R*, R, and R* may also be hydrogen atoms, moreover. At least one of the radicals R*, R, and R* is linked by a chemical bond, to a polymer chain of kind A. The group needed for the coupling reaction is designated Y. In specific versions of this invention, single or plural radicals R*, R or R* may be of the same identity as $R^\circ$, $R^{\circ\circ}$ or $R^{\circ\circ\circ}$. It is also in accordance with the invention if group X and group Y are identical. In this specific case the coupling takes place advantageously by means of a coupling reagent or by the action of a catalyst or initiator. For the purposes of this invention it is particularly advantageous if the coupling reaction is initiated by exposure to electromagnetic radiation and/or particulate radiation.

For the purposes of this invention it is possible to use an arbitrarily large number of further groups, which may react with a group X and/or with a group Y.

Figure 2:
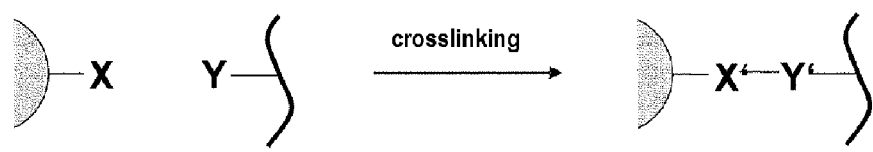
FIG. 2 illustrates the formation of a bond between functional groups X and Y.

A coupling reaction may proceed by chemical reaction directly between the groups X and Y, so forming a species $(R^\circ R^{\circ\circ} R^{\circ\circ\circ} C)$—X'—Y'—(CR*RR*) (see FIG. 2). In the case of a chemical reaction, X' and Y' are the reaction products of the groups X and Y respectively. In specific cases the coupling of groups X and Y requires a coupling reagent $X^a$—$Y^a$ or $X^a$—$R^a$—$Y^a$. $X^a$ and $Y^a$ are groups capable of reaction with groups X and Y, respectively, and may be identical or different. It is also possible, furthermore, to link two groups X via coupling reagent Y—$R^b$—Y and also two groups Y via a coupling reagent X—$R^b$—X. $R^a$ and $R^b$ can be saturated or unsaturated, aliphatic or aromatic hydrocarbon radicals and may contain an arbitrary number of heteroatoms. The radicals $R^a$ and $R^b$ may be of low molecular mass or may be polymeric in nature.

Table 1 lists a number of examples of X and Y which can be used in accordance with the invention. Combinations of groups which can be used with advantage are marked with a cross. In certain circumstances, additional reagents and/or special conditions are needed for the reaction between the groups indicated. Reagents of this kind are then added to the PSA formulation (see "Further constituents" section). Specific conditions such as temperature or radiation also come within the intention of this invention. The table does not make any claim to completeness, but is intended merely to indicate examples of groups which can be employed for the purposes of this invention, and combinations of groups that can be employed. Further groups and combinations, known to the skilled worker, for corresponding reactions may likewise be employed in accordance with the invention. The radicals $R^1$, $R^2$, $R^3$, $R^4$, $R^5$, and $R^6$ and also $R^a$, $R^b$, $R^c$, $R^d$, $R^e$ and $R^f$ in Table 1 may independently of one another be saturated or unsaturated, aliphatic or aromatic hydrocarbon radicals, which may contain any number of heteroatoms and may be of low molecular mass or may be polymeric in nature, and/or, alternatively, may be hydrogen atoms. In accordance with the definition above, the radicals may be identical or different in construction. The radicals $R^1$, $R^2$, and $R^3$ may be linked to one another, the radicals $R^5$ and $R^6$ may be linked to one another, the radicals $R^a$, $R^b$, and $R^c$ may be linked to one another, and the radicals $R^e$ and $R^f$ may be linked to one another. Cyclic acid anhydrides such as maleic anhydride or succinic anhydride may be attached arbitrarily as a chemical group to polymers A or filler particles B. Maleic anhydride offers the possibility, furthermore, of being incorporated as a comonomer in polymers A.

The entry "-PI" in Table 1 refers to a group which is possessed of a photoinitiator function. Irradiation with UV light of appropriate wavelength activates the group and, depending on the nature of the photoinitiator, a free-radical reaction or a cationic reaction is initiated. Suitable representatives of such groups are type-I photoinitiators, in other words α-cleaving initiators such as benzoin derivatives and acetophenone derivatives, benzil ketals or acylphosphine oxides, type-II photoinitiators, in other words hydrogen abstractors such as benzophenone derivatives and certain quinones, diketones and thioxanthones, and cationic photoinitiators, such as "photoacid generators" such as arylated sulfonium or iodonium salts and dimerized arylated imidazole derivatives. Further, triazine derivatives can be used to initiate free-radical and cationic reactions.

Photoinitiating groups X and/or Y of type I include for the purposes of this invention, preferably, benzoin, benzoin ethers such as, for example, benzoin methyl ether, benzoin isopropyl ether, benzoin butyl ether, benzoin isobutyl ether, methylolbenzoin derivatives such as methylolbenzoin propyl ether, 4-benzoyl-1,3-dioxolane and its derivatives, benzil ketal derivatives such as 2,2-dimethoxy-2-phenylacetophenone or 2-benzol-2-phenyl-1,3-dioxolane, α,α-dialkoxyacetophenones such as α,α-dimethoxyacetophenone and α,α-diethoxyactophenone, α-hydroxyalkyl phenones such as 1-hydroxycyclohexyl phenyl ketone, 2-hydroxy-2-methyl-1-phenylpropanone and 2-hydroxy-2-methyl-1-(4-isopropylphenyl)propanone, 4-(2-hydroxyethoxy)phenyl-2-hydroxy-2-methyl-2-propanone and its derivatives, α-aminoalkylphenones such as 2-methyl-1-[4-(methylthio) phenyl]-2-morpholinopropan-2-one and 2-benzyl-2-dimethylamino-1-(4-morpholinophenyl)butan-1-one, acylphosphine oxides such as 2,4,6-trimethylbenzoyldiphenylphosphine oxide and ethyl-2,4,6-trimethylbenzoylphenylphosphinate, and O-acyl-α-oximino ketones.

Photoinitiating groups of type II that can be used with preference in accordance with the invention are based for example on benzophenone and its derivatives such as 2,4,6-trimethylbenzophenone or 4,4'-bis(dimethylamino)benzophenone, thioxanthone and its derivatives such as 2-isopropylthioxanthone and 2,4-diethylthioxanthone, xanthone and its derivatives, and anthraquinone and its derivatives.

Type-II photoinitiators are used with particular advantage in combination with nitrogen-containing coinitiators, known as amine synergists. For the purposes of this invention it is preferred to use tertiary amines. Furthermore, in combination with type-II photoinitiators, hydrogen atom donors are employed advantageously. Examples thereof are substrates which contain amino groups. Examples of amine synergists are methyldiethanolamine, triethanolamine, ethyl 4-(dimethylamino)benzoate, 2-n-butoxyethyl 4-(dimethylamino)-benzoate, isoacryloyl 4-(dimethylamino)benzoate, 2-(dimethylaminophenyl)ethanone, and also unsaturated tertiary amines copolymerizable therewith, (meth)acrylated amines, unsaturated, amine-modified oligomers and polymers based on polyester or polyether, and amine-modified (meth)acrylates. For the purposes of this invention it is possible for such chemical assemblies to be linked to polymers and/or fillers.

For the purposes of this invention it is also possible to use any desired combinations of different varieties of type-I and/or type-II photoinitiating groups.

In one particularly preferred version of this invention, groups of photoinitiating character are present as groups Y in at least one kind of polymers A.

In a further particularly preferred version of this invention, groups of photoinitiating character are present as groups X in at least one kind of functionalized filler particles B.

When the coupling of the invention between the at least one polymer kind A and the at least one filler particle kind B proceeds via the groups Y and X by way of the formation of hydrogen bonds, the groups X and Y involved are defined in accordance with the following remarks. In this regard see, for example, D. Philp, J. F. Stoddard, *Angew. Chem.*, 1996, 108, 1242-1286 or C. Schmuck, W. Wienand, *Angew. Chem.*, 2001, 113, 4493-4499.

The PSAs of the invention comprise in this case at least one constituent which comprises one kind of segments having the general structure $(R^\#R^{\#\#}R^{\#\#\#\#}C)—X^\#$. $R^\#$, $R^{\#\#}$ and $R^{\#\#\#\#}$ may independently of one another be saturated or unsaturated, aliphatic or aromatic hydrocarbon radicals which may also be linked to one another and may be identical or different. For the purposes of this invention it is also possible for the carbon atom in $(R^\#R^{\#\#}R^{\#\#\#\#}C)—X^\#$ itself to be unsaturated. In that case said carbon atom is linked only to $X^\#$ and to one or two of the radicals $R^\#$, $R^{\#\#}$ or $R^{\#\#\#\#}$. The radicals $R^\#$, $R^{\#\#}$, and $R^\#$ may independently of one another include any number of heteroatoms. The radicals $R^\#$, $R^{\#\#}$, and $R^{\#\#\#\#}$ may be of low molecular mass or may be polymeric in nature. Up to two of the radicals $R^\#$, $R^{\#\#}$, and $R^{\#\#\#\#}$ may also be hydrogen atoms, moreover. At least one of the radicals $R^\#$, $R^{\#\#}$, and $R^{\#\#\#\#}$ is linked by a chemical or ionic bond, by chemisorption or physisorption, to a filler particle of kind B. The group needed for the coupling reaction is designated $X^\#$.

The at least one inventive segment of structure $(R^\#R^{\#\#}R^{\#\#\#\#}C)—X^\#$ is able to form hydrogen bonds with at least one functional segment which is present in at least one further constituent and which has the general structure $(R^\sim R^{\sim\sim}R^{\sim\sim\sim}C)—Y^\sim$. $R^\sim$, $R^{\sim\sim}$ and $R^{\sim\sim\sim}$ may independently of one another be saturated or unsaturated, aliphatic or aromatic hydrocarbon radicals which may also be linked to one another and may be identical or different. For the purposes of this invention it is also possible for the carbon atom in $(R^\sim R^{\sim\sim}R^{\sim\sim\sim}C)—Y^\sim$ itself to be unsaturated. In that case said carbon atom is linked only to $Y^\sim$ and to one or two of the radicals $R^\sim$, $R^{\sim\sim}$ or $R^{\sim\sim\sim}$. The radicals $R^\sim$, $R^{\sim\sim}$, and $R^{\sim\sim\sim}$ may independently of one another include any number of heteroatoms. The radicals $R^\sim$ $R^{\sim\sim}$, and $R^{\sim\sim\sim}$ may be of low molecular mass or may be polymeric in nature. Up to two of the radicals $R^\sim$, $R^{\sim\sim}$, and $R^{\sim\sim\sim}$ may also be hydrogen atoms, moreover. At least one of the radicals $R^\sim$, $R^{\sim\sim}$, and $R^{\sim\sim\sim}$ is linked by a chemical bond, to a polymer chain of kind A. The group needed for the coupling reaction is designated $Y^\sim$. In specific versions of this invention, single or plural radicals $R^\sim$, $R^{\sim\sim}$, and $R^{\sim\sim\sim}$ may be of the same identity as $R^\#$, $R^{\#\#}$ or $R^{\#\#\#\#}$. It is also in accordance with the invention if group $X^\#$ and group $Y^\sim$ are identical. In this specific case the coupling takes place by means of a coupling reagent.

For the purposes of this invention it is possible to use an arbitrarily large number of further groups, which may enter into a bond with at least one group X and/or at least one group Y.

A coupling reaction may proceed by formation of hydrogen bonds directly between the groups X# and Y# so forming a species $(R^\#R^{\#\#}R^{\#\#\#\#}C)—X^\#—Y^\sim-(CR^\sim R^{\sim\sim}R^{\sim\sim\sim})$ (see FIG. 2). In specific cases the coupling of groups $X^\#$ and $Y^\sim$ requires a coupling reagent $X^{\#a}—Y^{\sim a}$ or $X^{\#a}—R^{a'}—Y^{\sim a}$. $X^{\#a}$ and $Y^{\sim a}$ are groups capable of forming hydrogen bridges with groups $X^\#$ and $Y^\sim$, respectively, and may be identical or different. It is also possible, furthermore, to link two groups $X^\#$ via coupling reagent $Y^\sim—R^{b'}—Y^\sim$ and also two groups $Y^\sim$ via a coupling reagent $X^\sim—R^{b'}—X^\sim$. $R^{a'}$ and $R^{b'}$ can be saturated or unsaturated, aliphatic or aromatic hydrocarbon radicals and may contain an arbitrary number of heteroatoms. The radicals $R^{a'}$ and $R^{b'}$ may be of low molecular mass or may be polymeric in nature.

The coupleable groups may be unidentate or, preferably, multidentate. Denticity refers in this case to the capacity of a group to form a certain number of hydrogen bonds. Hydrogen bonds between unidentate or, preferably, multidentate functional segments, as structure-forming elements, are known from a variety of examples. In nature, hydrogen bonds between complementary functional segments are used for the construction of deoxyribonucleic acid (DNA) and ribonucleic acid (RNA). A specific combination of donor and acceptor sites makes it possible for couplings to be able to take place only in accordance with the lock-and-key principle. Where, for example, the functional segments α ("key" type) and β ("lock" type) are complementary segments which are able to form hydrogen bonds, then a compound is possible between α and β but not between α and α or between β and β. With regard to the selection of the functional segments, nature, when constructing DNA, restricts itself to the two organic base pairs adenine/thymine (or uracil instead of thymine in RNA) as bidentate segments and cytosine/guanine as tridentate segments.

Figure 3:
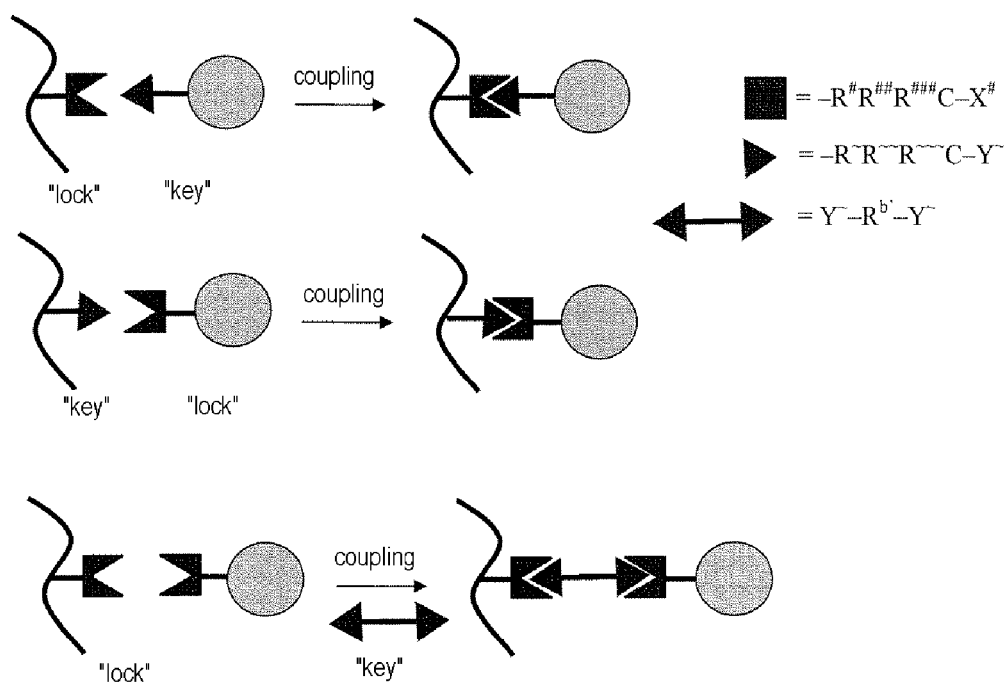
FIG. 3 shows two examples of the coupling of reactive constituents via formation of hydrogen bonds and via direct coupling of polymer A to particle B using a coupling reagent.

For the purposes of this invention it is possible to use polymers A and filler particles B having groups based on adenine, thymine, uracil, cytosine, guanine, derivatives thereof, and also further compounds capable of forming hydrogen bonds by the lock-and-key principle, such as, for example, 2-ureido-4-pyrimidone and its derivatives, 2,6-diacetylaminopyridine and its derivatives, diacetylpyrimidine and its derivatives, and ureidoacylpyrimidine and its derivatives. This listing makes no claim to completeness. Instead, the skilled worker is aware of further systems which can be used in accordance with the invention. When this kind of functionalization is chosen, then, for the purposes of this invention, either the at least one polymer kind A carries groups of the "key" type and the at least one filler particle B carries groups of the "lock" type, or vice versa. FIG. 3 shows two examples of the coupling of reactive constituents via formation of hydrogen bonds, by using two complementary groups; on the one hand, the direct coupling of polymer A and filler particle B, and, on the other, the coupling of polymer A and filler particle B using a coupling reagent.

Likewise possible in accordance with the invention is the coupling of groups via coordinate bonds. Examples of coordinate bonds are ligand-central atom bonds in complexes, i.e., the formation of a coordinate bond with metal atoms which may be present in elemental form, in the form of metal salts and/or in the form of metal complexes, and also all other donor-acceptor bonds (in this regard see, for example, D. Philp, J. F. Stoddard, *Angew. Chem.*, 1996, 108, 1242-1286; M. Rehahn, *Acta Polym.*, 1998, 49, 201-224 or B. G. G. Lohmeijer, U.S. Schubert, *J. Polym. Sci. A Polym. Chem.*, 2003, 41, 1413-1427).

If this coupling principle is chosen for the purposes of this invention, then the PSA comprises filler particles of kind B which contain groups having the general structure $(R^\S R^{\S\S}R^{\S\S\S}C)—X^\S$. $R^\S$, $R^{\S\S}$ and $R^{\S\S\S}$ may independently of one another be saturated or unsaturated, aliphatic or aromatic hydrocarbon radicals which may also be linked to one another and may be identical or different. For the purposes of this invention it is also possible for the carbon atom in $(R^\S R^{\S\S}R^{\S\S\S}C)—X^\S$ itself to be unsaturated. In that case said carbon atom is linked only to $X^\S$ and to one or two of the radicals $R^\S$, $R^{\S\S}$ or $R^{\S\S\S}$. The radicals $R^\S$, $R^{\S\S}$, and $R^{\S\S\S}$ may independently of one another include any number of heteroatoms. The radicals $R^\S$, $R^{\S\S}$, and $R^{\S\S\S}$ may be of low molecular mass or may be polymeric in nature. Up to two of the radicals $R^\S$, $R^{\S\S}$, and $R^{\S\S\S}$ may also be hydrogen atoms, moreover. At least one of the radicals $R^\S$, $R^{\S\S}$, and $R^{\S\S\S}$ is linked by a chemical or ionic bond, by chemisorption or physisorption, to a filler particle of kind B. The group needed for the coupling reaction is designated $X^\S$. At the same time the PSA comprises polymers of kind A which contain groups having the general structure $(R^=R^{==}R^{===}C)-Y^=$. $R^=$, $R^{==}$ and $R^{===}$ may independently of one another be saturated or unsaturated, aliphatic or aromatic hydrocarbon radicals which may also be linked to one another and may be identical or different. For the purposes of this invention it is also possible for the carbon atom in $(R^=R^{==}R^{===}C)-Y^=$ itself to be unsaturated. In that case said carbon atom is linked only to $Y^=$ and to one or two of the radicals $R^=$, $R^{==}$ or $R^{===}$. The radicals $R^=$, $R^{==}$, and $R^{===}$ may independently of one another include any number of heteroatoms. The radicals $R^=$, $R^{==}$, and $R^{===}$ may be of low molecular mass or may be polymeric in nature. Up to two of the radicals $R^=$, $R^{==}$, and $R^{===}$ may also be hydrogen atoms, moreover. At least one of the radicals $R^=$, $R^{==}$, and $R^{===}$ is linked by a chemical bond, to a polymer chain of kind A. The group needed for the coupling reaction is designated $Y^=$. The groups $X^\S$ and $Y^=$ may be identical or different. If they are different, then one of the varieties of groups takes on the donor function and the other the acceptor function that are necessary for the formation of coordinate bonds. If both groups are of the same kind, then the coordinate bond is formed by way of a coupling reagent.

Figure 4:
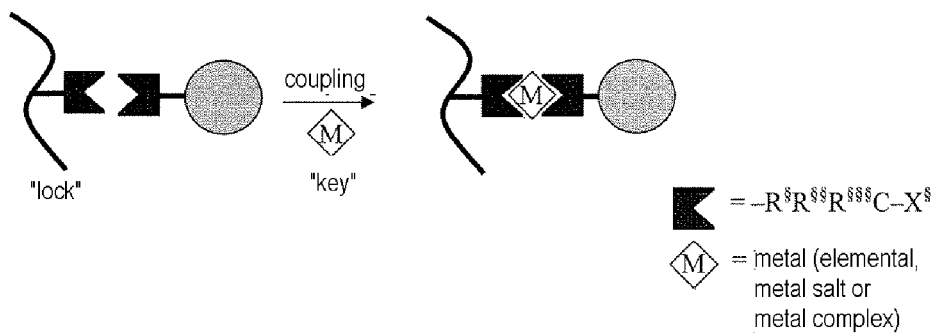
FIG. 4 illustrates the coupling of polymer A and filler B through metal of type M.

The groups in the polymers A and filler particles B are advantageously constructed such that they are capable of being able to form coordinate bonds with metals of type M, which may be in elemental form, in metal salt form or in the form of metal complexes. Metal complexes may also be polynuclear. Unidentate or multidentate segments may be employed. The coupling principle is depicted diagrammatically in FIG. 4. At least two groups of the "key" type couple by coordination of M, which takes on the "lock" function. During the formation of the coordinate bond, the structure of M may alter to become M'. This may be manifested in altered oxidation states or else in an altered ligand structure and/or ligand composition. When using metal atoms it is particularly advantageous for the purposes of this invention to take special precautions to disperse M in the PSA. This is preferably accomplished by choosing particularly suitable counterions, in the case of metal salts, or particularly suitable complex ligands, in the case of metal complexes. Suitable counterions and complex ligands therefore take on the function of compatibilizers and dispersing assistants. It is particularly advantageous to disperse the metal atom M in a meltable matrix that contains no constituents able to enter into coordinate bonds with M. This mixture is metered into the rest of the PSA formulation, comprising at least one polymer kind A and at least one filler particle kind B, not until immediately before the coating operation.

Particular preference is given to coupling using chelating segments. Examples of ligands which may be employed as groups are bipyridine and terpyridine and also their derivatives, acetylacetonate and its derivatives, ethylenediaminetetraacetic acid and its derivatives, nitrilotriacetic acid and its derivatives, hydroxyethylethylenediaminetriacetic acid and its derivatives, diethylenetriaminepentaacetic acid and its derivatives, and carboxylic acids. This listing makes no claim to completeness. Instead, the skilled worker will be aware of further systems which may be used in accordance with the invention. These groups are not reactive with one another. All constituents containing these groups can therefore be used in one mass stream. The coupling of the groups takes place as soon as the mixture comprising metal atom M is admixed to the mass stream, which for the purposes of this invention takes place immediately prior to the coating operation.

Suitable metal atoms for the purposes of this invention are all those chemical elements capable of acting as an acceptor for coordinate bonds. These are alkaline earth metals, preferably Ca and/or Mg, transition metals, preferably Ti, Mn, Fe, Co, Ni, Cu, Zn, Mo, Ru, Rh, Pd, W, Re, Os, Ir and/or Pt, and also Al and lanthanoids. Examples of suitable compatibilizers and dispersing assistants for these metal atoms which can be used in accordance with the invention are alkoxides of aliphatic or aromatic, saturated or unsaturated molecules containing any desired number of heteroatoms, it being possible for these molecules to be of low molecular mass or to be polymeric in nature. Additionally suitable are open-chain or cyclic unsaturated hydrocarbons which contain any number of heteroatoms and may be of low molecular mass or may be polymeric in nature. Further dispersing assistants and compatibilizers for M, useful in accordance with the invention, are low molecular mass chelating compounds of organic identity.

Figure 5:
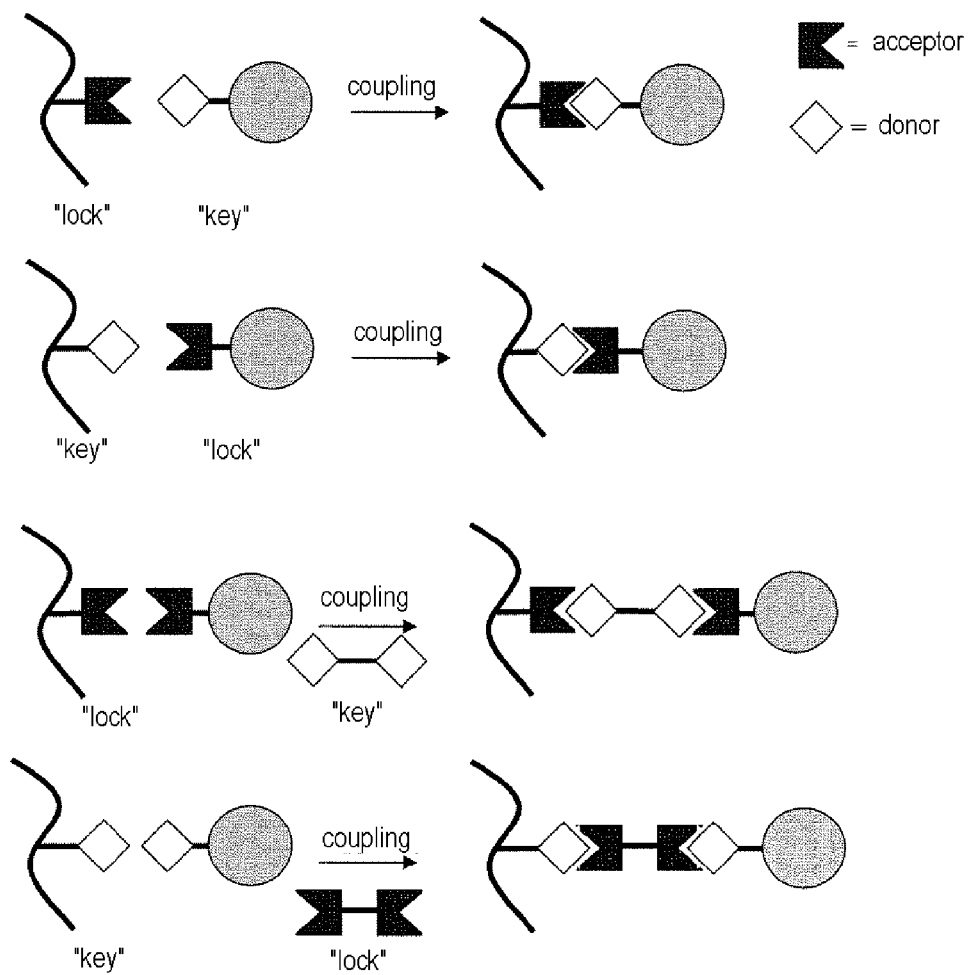
FIG. 5 illustrates coupling of polymer A and filler B through acceptor and donor groups.

Generally speaking, M can be an acceptor group ("key") which in conjunction with a donor group of the "lock" type is able to form a coordinate bond. In this case the acceptor group may be attached to polymer A and filler particle B or else may be used in the form of coupling reagents. This general case is depicted diagrammatically in FIG. 5. It is further in accordance with the invention to use filler particles B and polymers A furnished with acceptor groups in combination with coupling reagents which carry donor groups.

For the purposes of this invention it is possible for any desired combinations of different sorts of coupling reactions to be employed. In accordance with the invention at least one kind of coupling reaction is used.

Methods of Producing Self-Adhesive Products

The production of self-adhesive products of the invention embraces the operating steps of formulating/compounding, of coating, and of crosslinking.

Compounding Methods

The formulations of the invention can be produced using solvents in solvent kneading apparatus or else, for example, by using high-speed dispersers. Preferably, however, formulations of this kind are produced solventlessly. Appropriate for this purpose are kneading apparatus, in batch operation, and extruders, such as twin-screw extruders, in continuous operation. Suitable compounding units for the purposes of this invention are those which contain dispersive and, optionally, distributive mixing elements. Dispersive mixing elements ensure very fine distribution of the filler particles in the formulation, while the distributive elements homogenize melted constituents such as resins or polymers in the mixture of the PSA formulation. Particularly appropriate in solventless batch operation are Banbury mixers and also kneading apparatus of Buss or Baker-Perkins type. In continuous operation, twin-screw extruders in corotating mode can be used with preference.

Coating Methods

Coating methods which can be employed for the purposes of this invention include knife coating methods, nozzle knife coating methods, rolling rod nozzle methods, extrusion nozzle methods, casting nozzle methods, and caster methods. Likewise in accordance with the invention are application methods such as roll application methods, printing methods, screen-printing methods, patterned roll methods, ink-jet methods, and spraying methods. For the feeding of the coating unit of the invention it is possible as an option to include a conveying and/or mixing assembly, e.g., a single-screw or twin-screw extruder, between metering system and mixing system. The extruder which can be used alternatively is separately heatable.

Crosslinking Methods

It is particularly preferred to initiate the crosslinking of the PSA following the operation of applying it by coating. Particularly advantageous for this purpose is a radiation process. One very preferred variant that may be mentioned, and that be used for the purposes of this invention, is that of crosslinking with ultraviolet radiation. By means of brief exposure to light in a wavelength range between 200 to 400 nm, the coated material, which in this version of the invention contains the photoinitiator functions preferably as groups X and/or groups Y, is irradiated and hence crosslinked. Employed in particular for this purpose are high-pressure or medium-pressure mercury lamps at a power of 80 to 240 W/cm. Other radiation sources which can be used for the purposes of this invention are those familiar to the skilled worker. Alternatively, the emission spectrum of the lamp is adapted to the photoinitiator used, or the type of photoinitiator is adapted to the lamp's spectrum. The intensity of irradiation is adapted to the respective quantum yield of the UV photoinitiator, to the degree of crosslinking that is to be set, and to the web speed.

Furthermore, it is possible with preference to crosslink the PSA formulations of the invention with electron beams after they have been applied by coating. This may also take place in combination with a UV crosslinking operation. Typical irradiation equipment that may be employed includes linear cathode systems, scanner systems, and segmented cathode systems where electron beam accelerators are concerned. Typical acceleration voltages are situated in the range between 50 kV and 1 MV, preferably between 80 kV and 300 kV. The radiation doses employed are situated between 5 to 250 kGy, in particular between 20 and 100 kGy.

For the purposes of this invention it is additionally possible with preference to realize the crosslinking by exposure to thermal energy. This can be done optionally in combination with one or more radiation methods. Where thermal energy is used to initiate the crosslinking reaction, care must be taken to ensure that, during the coating operation, the crosslinking process has not progressed too far, since this alters the coating characteristics of the formulation. Particular preference is given in this case to producing a compound which already comprises filler particles of kind B and polymers of kind A, but with the groups X and Y selected such that they are able to react not directly with one another but rather only through the intermediacy of a crosslinker or a coupling reagent. In that case, crosslinkers or coupling reagents are preferably metered into the otherwise fully homogenized compound immediately prior to the coating operation, and are mixed with said compound. With particular preference a two-component or multicomponent operation is conducted in which all of the raw materials have been divided up between at least two mass reservoirs in such a way as to ensure the physical separation, up until immediately prior to the coating operation, of all those raw materials that are capable of a thermal reaction with one another. The thermal energy is then either taken from the preheated mass streams, made available by setting a temperature of the coating unit, or realized by way of a heating tunnel and/or an infrared section after the coating operation. It is likewise possible in accordance with the invention to utilize the thermal energy given off in one or more exothermic reactions in order for this thermal reaction to proceed. Combinations of these methodological possibilities particularly with the radiation crosslinking methods are possible within the context of this invention.

With great preference in the context of this invention, self-adhesive products of the invention are produced in a continuous operation in the course of which the steps of compounding, of coating, and of crosslinking are coupled directly and hence in which an inline operation is employed.

Self-Adhesive Products

Product Constructions

Figure 6:
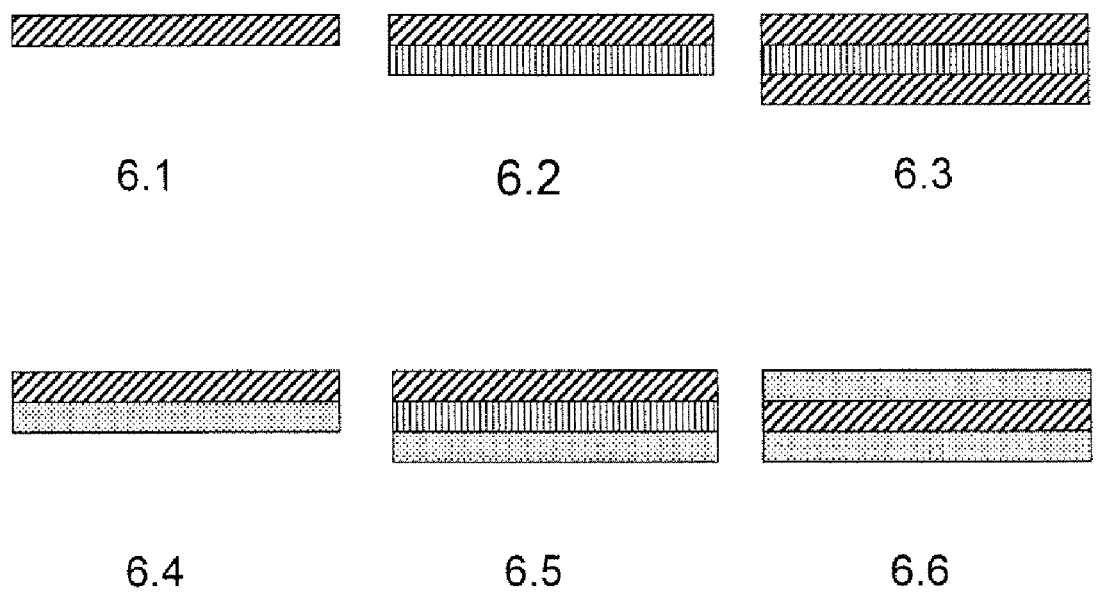
FIG. 6 illustrates the construction of self-adhesive products of the invention.

The pressure-sensitive adhesives prepared by the processes of the invention can be utilized for constructing different kinds of self-adhesive products such as, for example, self-adhesive tapes or self-adhesive sheets. Inventive constructions of self-adhesive products are depicted in FIG. 6. Each layer in the self-adhesive tape constructions of the invention may, as an alternative, be in foamed form.

In the simplest case a self-adhesive product of the invention is composed of the pressure-sensitive adhesive (PSA) in single-layer construction (construction in FIG. 6.1). This construction may optionally be lined on one or both sides with a release liner, e.g., a release film or release paper. The layer thickness of the PSA is typically between 1 µm and 2000 µm, preferably between 5 µm and 1000 µm.

The PSA may additionally be on a backing, in particular a film or paper backing or a sheetlike textile structure (construction in FIG. 6.2). The backing in this case may have been pretreated in accordance with the prior art on the side facing the PSA, so that, for example, an improvement in PSA anchorage is obtained. The side may also have been provided with a functional layer which can act, for example, as a barrier layer. The reverse of the backing may have been pretreated in accordance with the prior art so as to achieve, for example, a release effect. The reverse of the backing may also have been printed. The PSA may optionally be lined with a release paper or release film. The PSA has a typical layer thickness of between 1 µm and 2000 µm, preferably between 5 µm and 1000 µm.

In the case of the construction according to FIG. 6.3 the self-adhesive product is a double-sided product comprising as its middle layer, for example, a backing film, a backing paper, a sheetlike textile structure or a backing foam. In this construction, PSAs of the invention of identical or different kind and/or of identical or different layer thickness are employed as top and bottom layers. The backing (or carrier) may in this case have been pretreated in accordance with the prior art on one or both sides, thereby achieving, for example, an improvement in PSA anchorage. It is also possible for one or both sides to have been provided with a functional layer which connect, for example, as a barrier layer. The PSA layers may optionally be lined with release papers or release films. The layers of PSA typically have thicknesses, independently of one another, of between 1 µm and 2000 µm, preferably between 5 µm and 1000 µm.

As a further double-sided self-adhesive product, the construction according to FIG. 6.4 is an inventive variant. A PSA layer of the invention carries on one side a further PSA layer which, however, may be of any desired nature and therefore need not be inventive. The construction of this self-adhesive product may be lined optionally with one or two release films or release papers. The layers of PSA typically have thicknesses, independently of one another, of typically between 1 µm and 2000 µm, preferably between 5 µm and 1000 µm.

As in the case of the construction in FIG. 6.4, the construction according to FIG. 6.5 is a double-sided self-adhesive product which comprises a PSA of the invention and also one other PSA of any kind. In FIG. 6.5, however, two PSA layers are separated from one another by a backing (or carrier), a backing film, backing paper, a sheetlike textile structure or a backing foam. The backing in this case may have been pretreated in accordance with the prior art on one or both sides, thereby achieving, for example, an improvement in PSA anchorage. It is also possible for one or both sides to have been provided with a functional layer which connect, for example, as a barrier layer. The PSA layers may optionally be lined with release paper or release film. The PSA layers have thicknesses, independently of one another, of typically between 1 μm and 2000 μm, preferably between 5 μm and 1000 μm.

The self-adhesive product of the invention according to FIG. 6.6 comprises a layer of inventive material as a middle layer, which is provided on both sides with any desired PSAs of identical or different type. One or both sides of the middle layer may have been provided with a functional layer which connect, for example, as a barrier layer. For the outer PSA layers it is not necessary for inventive PSAs to be employed. The outer PSA layers may optionally be lined with release paper or release film. The outer PSA layers have thicknesses, independently of one another, of typically between 1 μm and 2000 μm, preferably between 5 μm and 1000 μm. The thickness of the middle layer is typically between 1 μm and 2000 μm, preferably between 5 μm and 1000 μm.

Test Methods

In the description of this invention, numerical values are given for systems of the invention and reference is made to test methods by means of which such data can be determined. These test methods are collated below.

Determination of Processing Properties (Test A)

Melt viscosities (Test A1) and first normal stress differences are determined for solvent-free, uncrosslinked test specimens as a function of shear rate and temperature by means of a PC-controlled high-pressure capillary rheometer from Göttfert (model: Rheograph 2002) from the pressure drops measured in the steady-state flow range. The capillary used is, for example, a flat slot with geometry of 23 mm×25 mm×0.16 mm (L×W×H). Values for the shear rates, viscosities, and first normal stress differences indicate that in this description are corrected data. The shear rate chosen for the tests is $1000\ s^{-1}$. The measurement temperature depends on the nature of the material under investigation and is reported together with the results. From the data for shear rate, viscosity, and first normal stress difference, the R value is determined as a ratio between the first normal stress difference and the product of viscosity and shear rate (Test A2).

Determining the Gel Fraction (Test B)

Coated and crosslinked, solvent-free PSA samples are welded into a nonwoven polyethylene pouch. Soluble constituents are extracted with toluene for a period of three days, the solvent being replaced daily. The difference in sample weights before and after extraction gives the gel index, as the percentage weight fraction of the polymer which cannot be extracted with toluene.

Determining the Bond Strength (Test C)

The peel strength (bond strength) is tested in accordance with PSTC-1. A PSA layer 50 μm thick is applied to a PET film 25 μm thick. A strip of this specimen 2 cm wide is adhered to a sanded steel plate by rolling over the specimen back and forth five times using a 5 kg roller. The plate is clamped in and the self-adhesive strip is pulled off from its free end on a tensile testing machine at a peel angle of 180° and a speed of 300 mm/min.

Determining the Holding Power (Test D)

The test takes place in accordance with PSTC-7. A PSA layer 50 μm thick is applied to a PET film 25 μm thick. A strip of this specimen 1.3 cm wide is adhered to a polished steel plaque over a length of 2 cm using a 2 kg roller, the specimen being rolled over back and forth twice. The plaques are equilibrated under test conditions (temperature and atmospheric humidity) for 30 minutes, but without a load. Then the test weight is hung on, thereby producing a shearing stress parallel to the surface of the bond, and a measurement is made of the time taken for the bond to fail.

TABLE 1

| | Functional groups of type Y | | | |
|---|---|---|---|---|
| Functional groups of type X | —CR$^a$=CR$^b$R$^c$ | —OC(=O)CR$^d$=CR$^a$R$^b$ | —OCR$^a$=CR$^b$R$^c$ | —CR$^a$—O—CR$^b$R$^c$ |
| —CR$^1$=CR$^2$R$^3$ | X | X | X | |
| —OC(=O)CR$^4$=CR$^1$R$^2$ | X | X | X | |
| —OCR$^1$=CR$^2$R$^3$ | X | X | X | |
| —CR$^1$—O—CR$^2$R$^3$ | | | | X |
| —NCO | | | | X |
| —NR$^1$R$^2$ | | X | | X |
| —N$_3$ | X | X | X | |
| —OH | | | | X |
| —SH | X | | | X |
| —C(=O)R$^1$ | | | | |
| —C(=O)—OH | | | | X |
| —C(=O)—O—C(=O)R$^1$ | | | | |
| Cyclic acid anhydride | | | | |
| —PI | X | X | X | X |
| —C≡CR$^1$ | | | | |
| —CR$^5$R$^6$H | X | X | X | |

TABLE 1-continued

| Functional groups of type X | Functional groups of type Y | | | | | | |
|---|---|---|---|---|---|---|---|
| | —NCO | —NR$^a$R$^b$ | —N$_3$ | —OH | —SH | —C(=O)R$^a$ | —C(=O)—OH |
| —CR$^1$=CR$^2$R$^3$ | | | X | | X | | |
| —OC(=O)CR$^4$=CR$^1$R$^2$ | | X | X | | | | |
| —OCR$^1$=CR$^2$R$^3$ | | | X | | | | |
| $\overset{\displaystyle -O-}{-CR^1-CR^2R^3}$ (epoxide) | X | X | | X | X | | X |
| —NCO | X | X | | X | X | | X |
| —NR$^1$R$^2$ | X | | | | | X | X |
| —N$_3$ | | | | | | | |
| —OH | X | | | | | | X |
| —SH | X | | | | X | | |
| —C(=O)R$^1$ | | X | | | | | |
| —C(=O)—OH | X | X | | X | | | |
| —C(=O)—O—C(=O)R$^1$ | | X | | X | X | | X |
| Cyclic acid anhydride | | X | | X | X | | X |
| —PI | | | | | | | |
| —C≡CR$^1$ | | | X | | | | |
| —CR$^5$R$^6$H | | | | | | | |

| Functional groups of type X | Functional groups of type Y | | | | |
|---|---|---|---|---|---|
| | —C(=O)—O—C(=O)R$^a$ | Cyclic acid anhydride | —PI | —C≡CR$^a$ | —CR$^e$R$^f$H |
| —CR$^1$=CR$^2$R$^3$ | | | X | | X |
| —OC(=O)CR$^4$=CR$^1$R$^2$ | | | X | | X |
| —OCR$^1$=CR$^2$R$^3$ | | | X | | X |
| $\overset{\displaystyle -O-}{-CR^1-CR^2R^3}$ (epoxide) | | | X | | |
| —NCO | | | | | |
| —NR$^1$R$^2$ | X | X | | | |
| —N$_3$ | | | | X | |
| —OH | X | X | | | |
| —SH | X | X | | | |
| —C(=O)R$^1$ | | | | | |
| —C(=O)—OH | X | X | | | |
| —C(=O)—O—C(=O)R$^1$ | | | | | |
| Cyclic acid anhydride | | | | | |
| —PI | | | | X | X |
| —C≡CR$^1$ | | | X | | |
| —CR$^5$R$^6$H | | | X | | |

We claim:

1. A solvent-free pressure-sensitive adhesive comprising at least one crosslinked polymer component having a molar mass of between 100,000 to 500,000, the crosslinking of the polymer component being brought about at least in part by incorporation of functionalized particles, the particles having at least one clay mineral base unit with a surface modification of this base unit, and the surface modification of the particles, wherein the surface modification is brought about by means of surface modification reagents selected from the group consisting of organosilanes, surfactants, organotitanium compounds, fatty acids and polyelectrolytes, the surface modification of the particles further having at least one kind of functional groups which are capable of reacting with functional groups present in the polymer component.

2. A self-adhesive product comprising the pressure-sensitive adhesive of claim 1.

* * * * *